(12) United States Patent
Pickard et al.

(10) Patent No.: US 11,511,781 B1
(45) Date of Patent: Nov. 29, 2022

(54) SYSTEM AND METHOD FOR CONTINUOUS WELDED RAIL RISK MODELING

(71) Applicant: BNSF Railway Company, Fort Worth, TX (US)

(72) Inventors: Christopher Neil Pickard, Argyle, TX (US); Kyle Keilty Williams, Fort Worth, TX (US); Michael L. Schram, Newman Lake, WA (US)

(73) Assignee: BNSF Railway Company, Fort Worth, TX (US)

(*) Notice: Subject to any disclaimer, the term of this patent is extended or adjusted under 35 U.S.C. 154(b) by 0 days.

(21) Appl. No.: 17/471,995

(22) Filed: Sep. 10, 2021

(51) Int. Cl.
*B61L 23/04* (2006.01)
*G06K 9/62* (2022.01)

(52) U.S. Cl.
CPC ........... *B61L 23/045* (2013.01); *B61L 23/047* (2013.01); *G06K 9/6218* (2013.01)

(58) Field of Classification Search
CPC .... B61L 23/042; B61L 23/044; B61L 23/045; B61L 23/047
See application file for complete search history.

(56) References Cited

U.S. PATENT DOCUMENTS

| | | | |
|---|---|---|---|
| 2012/0263342 A1* | 10/2012 | Haas | G06K 9/00 382/100 |
| 2014/0277824 A1* | 9/2014 | Kernwein | B61L 23/044 701/1 |
| 2021/0078622 A1* | 3/2021 | Miller | B61L 23/044 |

OTHER PUBLICATIONS

Martinez, Analytical model for predicting the buckling load of continuous welded rail tracks Proc IMechE Part F: J Rail and Rapid Transit, 2015, vol. 229(5) 542-552 (Year: 2015).*
Kish, Track Buckling Prevention: Theory, Safety Concepts, and Applications, DOT/FRA/ORD-13/16 (Year: 2013).*

* cited by examiner

*Primary Examiner* — Michael J Dalbo
(74) *Attorney, Agent, or Firm* — Enrique Sanchez, Jr.; Whitaker Chalk Swindle & Schwartz PLLC

(57) ABSTRACT

A system for modeling risk of rail buckling in railroad infrastructure is presented. The system can receive a myriad of data related to railroad tracks and/or railroad operations, and weight the data using specially-designed weighting factors that can be unique to each data type. The weighted data can be transformed via specialized algorithms to generate location scores reflective of a risk isolated to a particular area. The system can further utilize additional specialized algorithms to elucidate how such isolated risk can be extrapolated from one location to another. The system can implement a multilayer approach, formulating one or more layers of risk models and aggregating such models into an overarching risk model that can more-accurately forecast risk of rail buckling in a railroad track.

25 Claims, 12 Drawing Sheets

SYSTEM AND METHOD FOR CONTINUOUS WELDED RAIL RISK MODELING

TECHNICAL FIELD

The present disclosure relates generally to generating risk models for railroad infrastructure, such as with respect to modeling risk of rail buckling in continuous welded rail.

BACKGROUND

Rail transport systems traverse entire continents to enable the transport and delivery of passengers and goods throughout the world. A quintessential component of railroad infrastructure is the track—laid over a myriad of geographies and terrains, railroad tracks are designed to withstand the worst of the elements and facilitate disbursement of locomotives throughout the railroad system. Because of this constant exposure of the tracks to hazardous conditions, railroad companies must be vigilant in maintaining track integrity; if a section of track is compromised and the damage or obstruction is not quickly addressed, the consequences can be catastrophic.

The general structure of a track can include several components. Generally, a foundation referred to as the ballast, often made up crushed stone, gravel, or other aggregate, provides a compacted pathway on which the track can be laid; on top of the ballast are the rails and ties. Rails afford an actual surface on which rail vehicle wheels can roll. The rails run parallel with one another for thousands of miles, and the wheel-span of rail vehicles are specially designed and sized to match the track footprint. If rails were to separate laterally, the results would be disastrous. As such, to maintain a consistent and uniform distance between the rails, lateral slat-like components called ties are disposed between and coupled to the rails. The ties can be wood, concrete, or any other suitable material, and the ties can be secured to or within the ballast to facilitate track stability. The ties serve the very important purpose of maintaining lateral tension between the rails, such that the extreme weight of rail traffic does not lead to rail separation.

Considering the dire consequences of disjunctive rails in a railroad track, an especially problematic type of track damage is what is known as rail buckling—this is when the rails of a track buckle, such as due to longitudinal strain and/or pressure on the rails. Continuous welded rail ("CWR"), e.g., rail that is essentially a singular piece stretching over several miles (which can be accomplished by welding rail segments together) is especially prone to rail buckling. For example, because of the sheer length of a given CWR section, normally-insignificant changes in rail span can be drastically compounded—when a rail increases in temperature (such as due to weather conditions), linear expansion can occur, and such expansion, while negligible for smaller pieces of rail, can be feet or yards long for CWR sections that traverse several miles. Such length increase can cause significant longitudinal strain on the rail, and such strain, if unaddressed, can potentially overcome the strength of the lateral compression enabled by the ties, meaning that a rail can buckle. A rail buckle is a drastic angular alteration in track dimension that certainly leads to vehicle derailment if left unfixed.

SUMMARY

The present disclosure achieves technical advantages as a system and method for modeling risk of rail buckling with respect to railroad tracks. The system can account for a plurality of data in determining how at-risk a particular segment of track is with respect to rail buckling. The system can further weight such plurality of data to ensure adequate reflection of risk contribution by a given data type. The system achieves an extremely significant technical advantage in that the plurality of data and transformation thereof can provide forecast of high fidelity with respect to rail buckling risk. The system further implements a plurality of proximity thresholds that can enable the system to account for risk compounding that can occur by concentration of risk factors, such as those that can be collected and weighted by the system. The system can further utilize one or more geofences around asset locations, as well as specially formulated and weighted scoring algorithms, to facilitate consolidation and prioritization of rail segments to guide railroad systems maintenance priority.

The present disclosure solves the technological problem of utilizing collected data to accurately model risk of rail buckling in a railroad track. The present disclosure can receive a myriad of data, select how such data should be weighted, transform the data into meaningful representations of risk, and prioritize track locations based on such transformation and prioritization. The present disclosure can implement a tiered and/or layered approach to risk modeling, generating discrete models around specific asset types (e.g., such as asset types that this disclosure has determined can be the largest contributors to risk of rail buckling). In another embodiment, the present disclosure can go a step further by layering such discrete models on one another, utilizing, e.g., proximity thresholds and/or geofences to even further prioritize areas of high risk.

The present disclosure improves the performance and functionality of the system itself by implementing specialized algorithms adapted to receive, utilize, and generate data related to risk of rail buckling in railroad infrastructure. The system can implement scoring algorithms to successfully weight data in risk score generation, and further utilize consolidation algorithms to decide whether particular scored areas affect risk of other scored areas. The system provides a meaningful and extremely advantageous use for "big data," e.g. data generated with respect to multiple areas and faucets of railroad operation, such as by transforming the received data and implementing such transformed data in specialized algorithms to generate risk scores on a per-location basis.

The disclosed continuous welded rail risk modeling system can include a server in operable communication with a database, clients, and an interactive track chart system. The continuous welded rail risk modeling system can further be in operable connection with a plurality of sensors, gauges, receivers, transceivers, cameras, sirens, speaker, lights, or any other suitable devices or mechanisms designed to measure distance, position, location, and/or capture and/or receive data related to a track. The continuous welded rail risk modeling system can generate records containing relevant data, including scored area location, risk score, vehicle identity, vehicle velocity, vehicle direction, work time and date, time and date of proximity threshold satisfaction and/or geofence intersection, safety plan data, division data, and/or any other relevant data.

It is an object of the disclosure to provide a system for providing a meaningful use for mass data by generating one or more risk models related to rail buckling. It is a further object of the disclosure to provide a method for modeling risk of rail buckling in continuous welded rail. These and other objects are provided by at least the following embodiments.

In on embodiment, a system for modeling risk of rail buckling in continuous welded rail can comprise: a memory having a first database with a plurality of data, thresholds, and specifications related to railroad tracks and assets; and a computer processor operably coupled to the memory and capable of executing machine-readable instructions to perform program steps, the program steps including: receiving at least one data point related to a section of the railroad track; receiving at least one data score weighting factor; determining a first asset location; determining a first asset type; receiving a first asset score weighting factor; generating, via the processor, a first asset location score using the first asset score weighting factor, the at least one data point, and the at least one data score weighting factor, if the at least one data point satisfies a first proximity threshold relative to the first asset location; generating, via the processor, the first asset location score using the first asset score weighting factor, if the at least one data point does not satisfy the first proximity threshold; and determining a scored area having a scored area size and corresponding to at least the first asset location, wherein the first asset score weighting factor varies with the first asset type. Wherein the program steps further include: determining a second asset location; generating a second asset location score; and determining a distance between the first asset location and the second asset location. Wherein the program steps further include: if the distance between the first and second asset locations satisfies a second proximity threshold: including the first asset location and the second asset location in the scored area; generating, via the processor, a consolidated location score including the first asset location score and the second asset location score; and assigning the consolidated location score to the scored area. Wherein the program steps further include: determining a second asset type; receiving a second asset score weighting factor; generating, via the processor, the second asset location score using the second asset score weighting factor, the at least one data point, and the at least one data score weighting factor if the at least one data point satisfies a third proximity threshold relative to the second asset location; generating, via the processor, the second asset location score using the second asset score weighting factor if the at least one data point does not satisfy the third proximity threshold. Wherein the program steps further include: reducing the first asset location score if relieving work is performed at a location satisfying the first proximity threshold. Wherein the program steps further include prioritizing the scored area relative to at least one other scored area. Wherein the second asset score weighting factor varies with the second asset type. Wherein the program steps further include rendering into an interactive track chart. Wherein the at least one data point can comprise at least one of rail tie data, asset data, anchor data, fastener data, track grade data, ballast fouling index data, joint data, rail equipment incident data, rail defect data, velocity data, maintenance data, rail removal data, curve data, or destressing work data. Wherein the program steps further include: if relieving work is performed at a location satisfying the third proximity threshold, reducing the second asset location score.

In another embodiment, a method of modeling risk of rail buckling in continuous welded rail can comprise the steps of: receiving a plurality of data points related to a railroad track; receiving a plurality of data score weighting factors; receiving a plurality of asset locations; receiving a plurality of asset score weighting factors; determining a first proximity threshold relative to at least one of the plurality of asset locations; generating, via a processor, a plurality of asset location scores using at least one of the plurality of asset score weighting factors; determining, via a processor, a distance between at least two of the plurality of asset locations, each having an asset location score; and if a second proximity threshold between the at least two of the plurality of asset locations is satisfied: generating a consolidated scored area with the at least two of the plurality of asset locations; generating a consolidated location score including the asset location scores of the at least two of the plurality of asset locations; and assigning the consolidated location score to the consolidated scored area. Wherein the plurality of asset locations includes fixed asset locations, anchor locations, and tie cluster locations. Wherein the plurality of asset score weighting factors includes at least one fixed asset score weighting factor, at least one anchor score weighting factor, and at least one tie score weighting factor. Wherein the plurality of asset location scores includes at least one fixed asset location score, at least one anchor location score, and at least one tie cluster location score. Wherein if at least one of the plurality of data points satisfies the first proximity threshold, at least one of the plurality of asset location scores is generated using the at least one of the plurality of data points satisfying the first proximity threshold, at least one of the plurality of data score weighting factors, and at least one of the plurality of asset score weighting factors.

In another embodiment, a method of assessing risk in a railroad track of continuous welded rail can comprise the steps of: receiving a plurality of data points, each of the plurality of data points associated with a railroad track location; receiving a plurality of data score weighting factors; receiving at least one fixed asset location, at least one tie cluster location, and at least one anchor location; receiving at least one fixed asset score weighting factor, at least one tie score weighting factor, and at least one anchor score weighting factor; determining at least one first fixed asset geofence around the at least one fixed asset location, at least one first tie cluster geofence around the at least one tie cluster location, and at least one first anchor geofence around the at least one anchor location; generating at least one fixed asset location score using the at least one fixed asset score weighting factor and the at least one first fixed asset geofence; generating at least one tie cluster location score using the at least one tie score weighting factor and the at least one first tie cluster geofence; and generating at least one anchor location score using the at least one anchor score weighting factor and the at least one first anchor geofence. Wherein if at least one of the plurality of data points intersects the at least one first fixed asset geofence, the at least one fixed asset location score is generated using the at least one data point intersecting the at least one fixed asset geofence, at least one of the plurality of data score weighting factors, and the at least one fixed asset score weighting factor. Wherein if at least one of the plurality of data points intersects the at least one first tie cluster geofence, the tie cluster location score is generated using the at least one data point intersecting the at least one tie cluster geofence, at least one of the plurality of data score weighting factors, and the at least one tie score weighting factor. Wherein if at least one of the plurality of data points intersects the at least one first anchor geofence, the anchor location score is generated using the at least one data point intersecting the at least one anchor geofence, at least one of the plurality of data score weighting factors, and the at least one anchor score weighting factor. Further comprising the step of determining a plurality of second geofences, including at least one second fixed asset geofence around the at least one fixed asset location, at least one second tie cluster geofence around the at least one tie cluster location, and at least one second anchor geofence around the at least one anchor location. Further comprising the step of consolidating the at least one fixed asset location, at least one tie cluster location, or at least one anchor location with the other at least one fixed asset location, at least one tie cluster location, or at least one anchor location based on intersections of the second geofences.

In another embodiment, a continuous welded rail risk modeling system can comprise: one or more processors operably coupled to a memory and capable of executing machine-readable instructions; a data foundation system, comprising: a data collection module configured to receive, via the one or more processors, at least one data point related to a section of the railroad track, and a weighting module configured to receive, via the computer processor, at least one data score weighting factor; and an asset association and modeling system, comprising: a fixed asset relation and scoring module configured to generate, via the one or more processors, fixed asset location scores; a tie cluster relation and scoring module configured to generate, via the one or more processors, tie cluster scores, and an anchor layer relation and scoring module configured to generate, via the one or more processors, anchor location scores. Wherein the asset association and modeling system generates the fixed asset location score using a fixed asset score weighting factor, the received data satisfying a fixed asset proximity threshold, and data score weighting factors. Wherein the asset association and modeling system generates the tie cluster location score using a tie cluster score weighting factor, the received data satisfying a tie cluster proximity threshold, and data score weighting factors. Wherein the asset association and modeling system generates the anchor location score using an anchor score weighting factor, the received data satisfying an anchor proximity threshold, and data score weighting factors.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1:
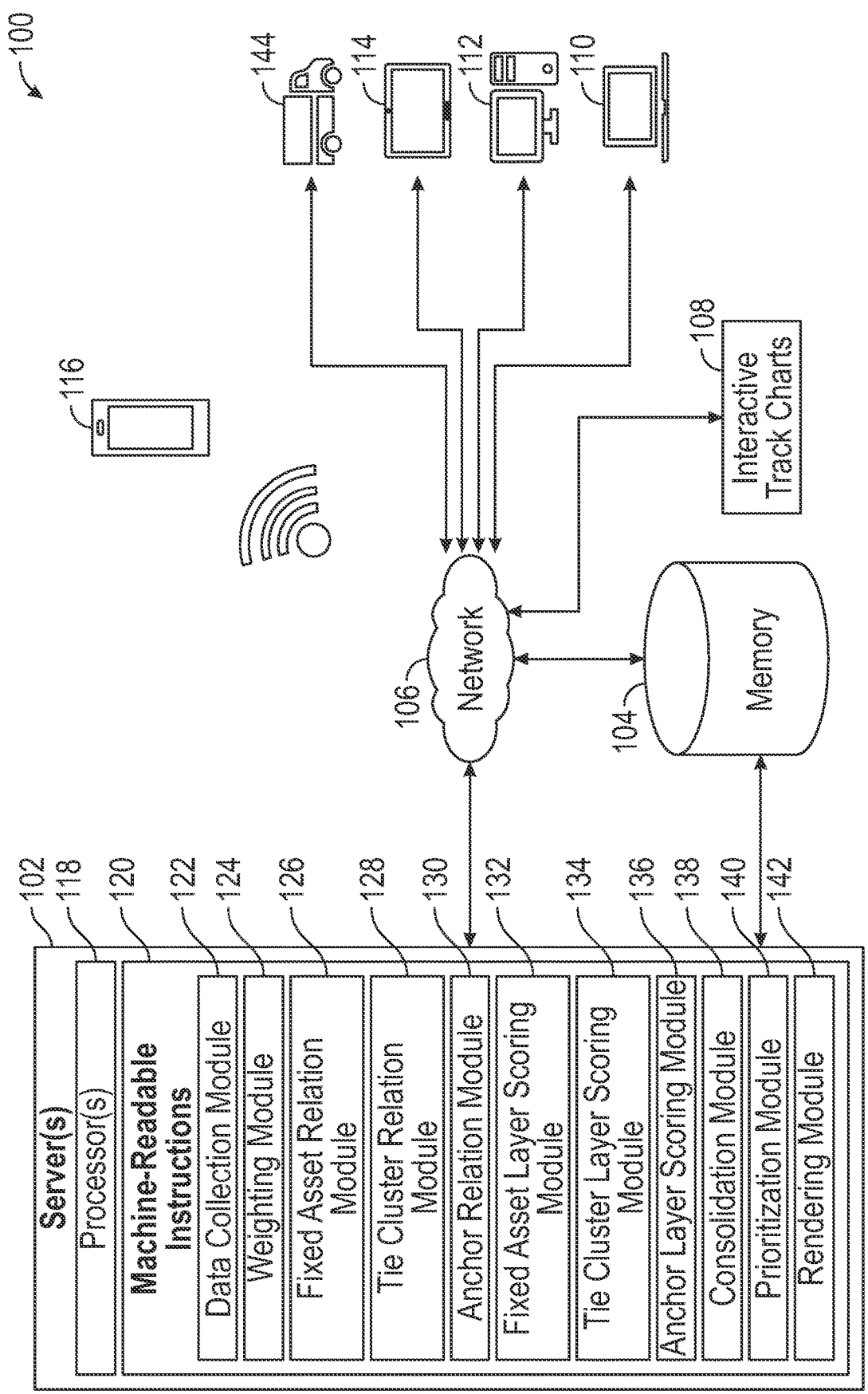
FIG. 1 illustrates a schematic view of a risk modeling system, in accordance with one or more exemplary embodiments of the present disclosure.

FIG. 1 illustrates a schematic view of a risk modeling system 100 in accordance with one or more embodiments of the present disclosure. The system 100 can include one or more servers 102 operably coupled to a database 104. The server 102 can be operably coupled to one or more clients 110, 112, 114, 116, 144 via a network connection 106. The clients can be a physical device (e.g., mobile phone 116, computer 110, 112, tablet 114, vehicle 144, onboard computer, wearable device, worker, worker-related device, alert device, or other suitable device), program, or an application. In one example, a client can include a wearable device such as a watch, smart watch, totem, token, badge, or any other wearable device. In another embodiment, the server 102 can be operably coupled to an interactive track chart system 108 via the network 106. For example, the interactive track chart system 108 can be like those known in the art. In another example, the interactive track chart system 108 can be a networked computer 108 in operable connection with the server 102 that is capable of receiving and/or obtaining track, vehicle, and/or worker data and transmitting the data to the server 102. In another embodiment, the server 102 can be in operable communication with a vehicle 144, such as a rail vehicle. For example, the system 100 can be configured such that the rail vehicle 144 can receive and/or transmit data to and/or from the server 102. The system 100 can be integrated with a railroad system or railroad infrastructure to facilitate the detection of defects in railroad components. It will be understood by those having skill in the art that detections, captured data, measurements, determinations, alerts, etc. encompassed by the system 100 can be promulgated and/or accessible to a railroad system at large via the network 106 or other operable connection. In one embodiment, the server 102 can include machine-readable instructions 120; in another embodiment, the server 102 can access machine readable instructions 120. In another embodiment, the machine-readable instructions can include instructions related to a data collection module 122, a weighting module 124, a fixed asset relation module 126, a tie cluster relation module 128, an anchor relation module 130, a fixed asset layer scoring module 132, a tie cluster layer scoring module 134, an anchor layer scoring module 136, a consolidation module 138, a prioritization module 140, and/or a rendering module 142.

The aforementioned system components (e.g., server(s) 102, interactive track chart system 108, and client(s) 110, 112, 114, 116, 138 etc.) can be communicably coupled to each other via the network 106, such that data can be transmitted. The network 106 can be the Internet, intranet, or other suitable network. The data transmission can be encrypted, unencrypted, over a VPN tunnel, or other suitable communication means. The network 106 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 106.

The data transmitted to and from the components of system 100 (e.g., the server 102, interactive track chart system 108, and clients), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

One or more server(s) 102 can be implemented in hardware, software, or a suitable combination of hardware and software therefor, and may comprise one or more software systems operating on one or more servers, having one or more processors 118, with access to memory 104. Server(s) 102 can include electronic storage, one or more processors, and/or other components. Server(s) 102 can include communication lines, connections, and/or ports to enable the exchange of information via a network 106 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 104 internally.

Memory 104 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 120, software algorithms, control logic, data generated by processor(s), data received from server(s), data received from computing platform(s), and/or other data that can enable server(s) to function as described herein. The electronic storage can also include third-party databases accessible via the network 106.

Processor(s) 118 can be configured to provide data processing capabilities in server(s) 102. As such, processor(s) 118 can include one or more of a digital processor, an analog processor, a digital circuit designed to process information, an analog circuit designed to process information, a state machine, and/or other mechanisms for electronically processing information, such as FPGAs or ASICs. The processor(s) 118 can be a single entity or include a plurality of processing units. These processing units can be physically located within the same device, or processor(s) 118 can represent processing functionality of a plurality of devices or software functionality operating alone, or in concert.

The processor(s) 118 can be configured to execute machine-readable instructions 106 or machine learning modules via software, hardware, firmware, some combination of software, hardware, and/or firmware, and/or other mechanisms for configuring processing capabilities on processor(s) 118. As used herein, the term "machine-readable instructions" can refer to any component or set of components that perform the functionality attributed to the machine-readable instructions component 120. This can include one or more physical processors 118 during execution of processor-readable instructions, the processor-readable instructions, circuitry, hardware, storage media, or any other components.

The server(s) 102 can be configured with machine-readable instructions 120 having one or more functional modules. The machine-readable instructions 120 can be implemented on one or more servers 102, having one or more processors 118, with access to memory 104. The machine-readable instructions 120 can be a single networked node, or a machine cluster, which can include a distributed architecture of a plurality of networked nodes. The machine-readable instructions 120 can include control logic for implementing various functionality, as described in more detail below. The machine-readable instructions 120 can include certain functionality associated with the WILD system 100. Additionally, the machine-readable instructions 120 can include a smart contract or multi-signature contract that can process, read, and write data to a database, distributed ledger, or blockchain.

Figure 2:
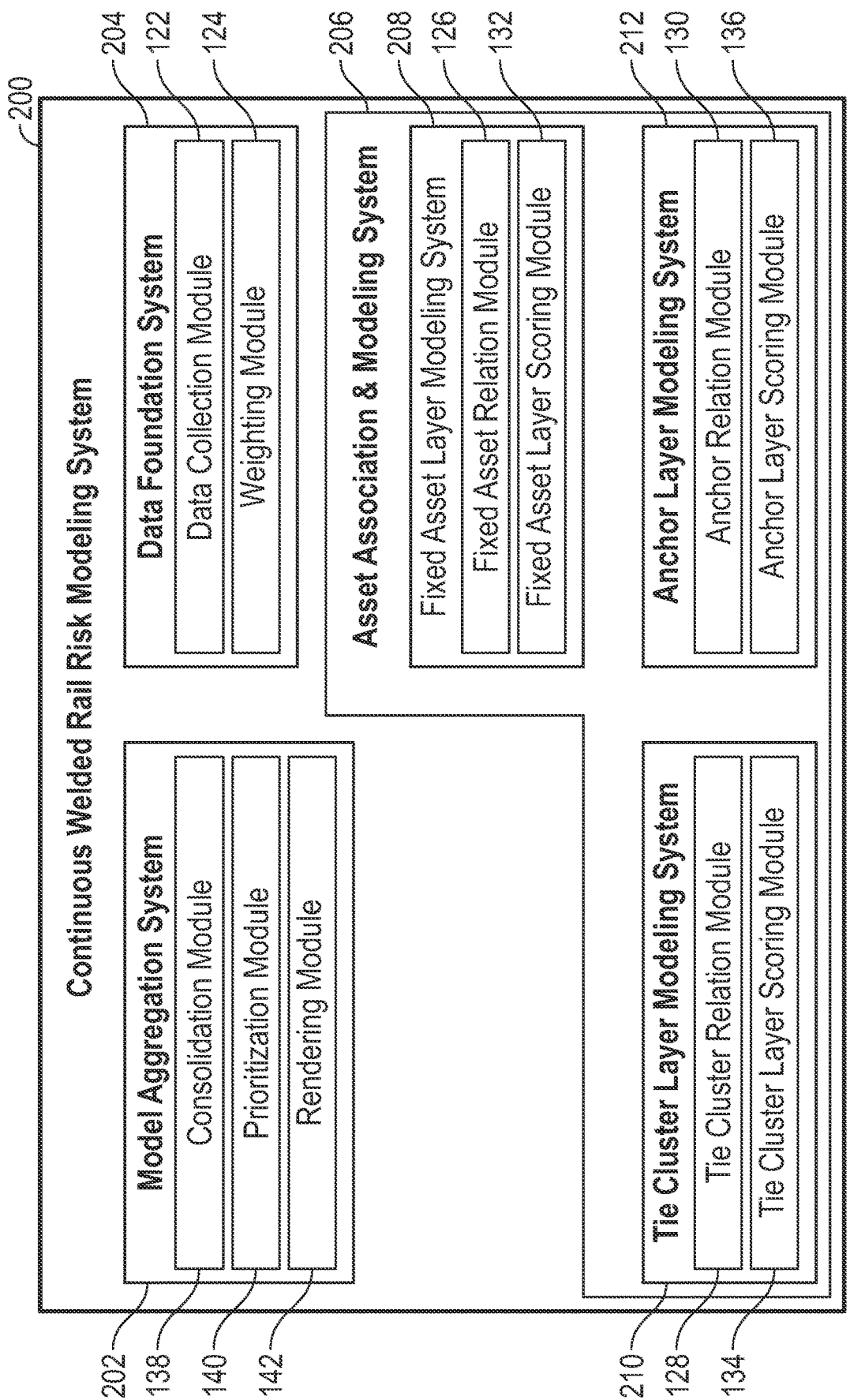
FIG. 2 illustrates an exemplary block diagram of a continuous welded rail risk modeling system, in accordance with one or more exemplary embodiments of the present disclosure.

FIG. 2 illustrates a schematic view of a continuous welded rail risk modeling system 200, in accordance with one or more exemplary embodiments of the present disclosure. System 200 can include a model aggregation system 202, a data foundation system 204, an asset association and modeling system 206, a fixed asset layer modeling system 208, a tie cluster layer modeling system 210, and an anchor layer modeling system 212. In one exemplary embodiment, the data foundation system 204 can include the data collection module 122 and the weighting module 124. In one example, the data collection module 122 and the weighting module 124 can implement one or more algorithms to facilitate the collection of data and transformation thereof into a statistically-relevant foundation, such as for use by the asset association and modeling system 206 and the model aggregation system 202. In one embodiment, the data foundation system 204 can be configured to initiate upon reception of data related to at least one railroad track, and subsequently weight the data accordingly to assist in generating a data foundation for risk modeling in accordance with one or more embodiments of the present disclosure.

In one embodiment, the data collection module 122 can be configured to receive and/or capture data from a myriad of sources that can be related to a railroad track and/or a railroad infrastructure. For example, the data collection module 122 can be configured to receive tie data, fixed asset data, anchor data, grade data, ballast data, joint data, rail equipment incident data, rail defects data, velocity data, maintenance data, rail removal data, curve data, distressing work data, and/or any other data suitable to be utilized in risk modeling. For example, the data collection module 122 can be an operable communication with one or more databases (such as database 104) that can store such data. In another embodiment, the data collection module 122 can be configured to capture data related to, for example, a railroad track. For example, the data collection module 122 can utilize sensors, cameras, radar, LIDAR, or any other component or mechanism suitable to capture and/or collect data related to railroad infrastructure. In another embodiment, the data collection module 122 can be configured to receive input from personnel, systems, or any other entity related to railroad infrastructure data.

In another embodiment, the data collection module 122 can be configured to receive data related to fixed assets in railroad infrastructure. For example, the data collection module 122 can be configured to receive data related to crossovers, turnouts, crossings, diamonds, bridges, overpasses, or any other fixed assets incorporated into railroad infrastructure. In one embodiment, the data collection module 122 can receive fixed asset locations, fixed asset types, maintenance history, or any other information regarding fixed assets. In another embodiment, the data collection module 122 can be configured to receive tie data. For example, the data collection module 122 can be configured to receive data related to tie composition, tie location, tie condition, or any other data related to one or more ties in railroad infrastructure. In one embodiment, the data collection module 122 can receive data from a tie auditing system and/or platform, such as data that can originate from an Aurora scanner. In another embodiment, the data collection module 122 can be configured to receive data related to anchors in a railroad infrastructure. For example, the data collection module 122 can be configured to receive data related to anchor type, anchor composition, anchor condition, or any other data related to an anchor.

In one embodiment, the data foundation system 204 can receive and/or collect data related to railroad infrastructure via the data collection module 122, and such data can be in the form of numerical data. For example, the data collection module 122 can count the number of curves, such as curves within a proximity threshold of an asset. In another example, the data collection module 122 can determine which sections of track require particular speed changes within particular distances. In another example, the data collection module 122 can determine grade changes in the track. In another embodiment, the data collection module 122 can received data related to the ballast fouling index. In another embodiment, the data collection module can receive any myriad of data related to railroad infrastructure and transform such data into numerically-represented data. For example, the data collection module 122 can determine that a ballast fouling index of a certain magnitude can be represented with a particular integer. In another embodiment, the data collection module 122 can count a number of joints of a track, and the number of joints can be represented by an integer. In another example, the data collection module 122 can count the number of rail equipment incidents (and/or other events) on a given track and/or track segment, and such number of rail equipment incidents and/or other events can be represented by an integer. In another embodiment, the data collection module 122 can collect data related to anchor and/or faster conditions and assign numerical values depending on a condition. In another embodiment, the data collection module 122 can identify and/or count anchors and/or fasteners and further receive conditions of such anchors/fasteners.

In another example, the data collection module 122 can receive data related to rail defects. In one example, the data collection module 122 can count the number of defects associated with a particular track location, such as defects addressed within a particular historical time period and represent such count with an integer. In another embodiment, the data collection module 122 can determine and/or receive data related to tie and rail work performed on a track within a particular time. In one embodiment, the data collection module 122 can count the number of these events and represent this count with an integer. In another embodiment, the data collection module 122 can represent any of the data as singular events. For example, the data collection module 122 can identify the location of these events and/or infrastructure components and represent them in any appropriate manner, such as by indicating such event/component as present or not present. For example, the data collection module 122 can indicate that rail events have occurred at particular sections of track. In another embodiment, the data collection module can indicate that anchors/fasteners are located at particular positions on a track and further indicate the condition of such anchors/fasteners. In another example, the data collection module 122 can indicate if a section of track has a particular grade exceeding a grade threshold. In another example, the data collection module 122 can indicate if a section of track is subject to a particular speed change within a particular distance.

In one exemplary embodiment, the data collection module 122 can collect any myriad of data related to a railroad infrastructure and associate such data with a track infrastructure. For example, the data can be represented by unique data points around and/or on a track map. For example, each anchor on a track having a particular condition can be indicated by one type of data point, and each anchor on a track having a particular different condition can be indicated by a different type of data point. In another example, a speed change on a particular section of track can be indicated by a particular data point. In another example, the grade of the track can be indicated by a particular data point. In one embodiment, the data foundation system 204 can determine and/or recognize what a given particular data point represents with respect to the type of data/event collected. In another embodiment, the data collection system can represent these data/events as tickers, set/not set, counters, or any other indication of present or not present. For example, the data collection module 122 can collect such data and indicate that a particular data/even is present on or near a particular area of track. In one embodiment, the data collection system 122 can be visualized as outputting a track map with a myriad of data points, each having different identifiers, scattered thereon. Each data point, depending on its identity, can represent a different event and/or characteristic (anchor of certain quality, rail work performed within some time period, section where speed change occurs, etc.). In one embodiment, the absence of a data point can indicate that a particular characteristic/event is not present. In another embodiment, the data collection module 122 can identify any event and/or characteristic, like those discussed herein, associated with a railroad infrastructure and further associate a particular location to such characteristic and/or event.

In another embodiment, the data foundation system 204 can collect, transmit, capture, and/or receive data such as the following:

Tie clusters (Bad Tie Clusters)—7 or more bad ties in a row
2019 Tie Program
Assets on Main, Branch, Sidings
  Crossovers, Pwr/Man Turnouts, Public/Prvt Xings, Diamonds
  Full Ballast Desk Bridges
Open NextGen Anchor and Fastener Conditions found in the last year
Grades ≤−1.0% and ≥1.0%
BFI ≥40 (Most Recent Scan)
Joints on Main and Sidings
T109 Rail Equipment Incidents (REIs)
Rail Defects
Speed changes ≥20 MPH w/in 2 miles
Tie and Rail Work over past year
Open Rail Removal Zones and Destress Locations
Curves (Identified those w/in 0.2 miles of a fixed asset, intersecting grade changes, anchor condition, bad ties)

In another embodiment, the data foundation system 204 can including weighting factors such as the following, or other suitable weighting factors:

Fixed_Objects_Mult=3.0
Bad_Repl_Ties_Mult=2.0
Anchor_Red_Mult=2.0
BFI_Mult=2.0
Rail_Defect_Mult=2.0
Joint_Mult=2.0
Grade_Mult=1.5
Speed_Change_Mult=1.5
Low_Pre_Brk_Mult=1.5
Anchor_Yel_Mult=1.25
Rail_Relay_Mult=0.0
CWR_mult=2.0

For example, the "Fixed_Objects_Mult" can corresponded to fixed assets. In another example, the "Bad_Repl_Ties_Mult" can correspond to a tie cluster, e.g. a cluster of ties of a particular quality. In another example, "Anchor_Red_Mult" can correspond to anchors of a particular quality. In another example, "Rail_Defect_Mult" can correspond to rail defects. In another example, "Joint_Mult" can correspond to joints, such as joints on the main track and/or a siding. In another example, "Grade_Mult" can correspond to a grade satisfying a particular grade threshold. In another example, "Speed_Change_Mult" can correspond to a section of track where a particular speed change mandate and/or directive is recommended. In another example, "Low_Pre_Brk_Mult" can correspond to a section of track where a particular type of work has been performed. In another example, "Low_Pre_Brk_Mult" can correspond to a section of track where data collection from a particular type of event occurred and using industry-wide modeling practices indicated a lower-than-normal rail neutral temperature. In another example, "Anchor_Yel_Mult" can correspond to anchors of a particular quality. In another example, "Rail_Relay_Mult" can correspond to a particular type of work performed. In another example, "CWR_Mult" can correspond to a type of rail, e.g., continuous welded rail.

In one embodiment, the weighting module 124 can be configured to receive and/or transmit weighting factors associated with particular railroad constituents. In one embodiment, railroad constituents can include assets, fixed assets, rails, ties, anchors, joints, ballast, vehicles, personnel, workers, buildings, systems, or any other components or entities related to railroad and/or a railroad infrastructure. For example, the weighting module 124 can be configured to access a database (such as database 104) having a plurality of weighting factors. The weighting module 124 can, in one embodiment, receive weighting factors and associate the weighting factors with the appropriate railroad constituent. For example, the weighting module 124 can determine that data collected by the data collection module 122 can be related to fixed assets, ties, and/or anchors, and the weighting module 124 can further receive weighting factors related to these constituents and associate the appropriate weighting factors with the particular constituents. In another embodiment, the weighting module 124 can be configured to store and/or access a plurality of weighting factors that can be used by, for example, the asset association and modeling system 206.

In another embodiment, the weighting model 124 can receive and/or transmit any number of weighting factors (multipliers). For example, the weighting module 124 can include fixed object multipliers, bad tie multiplier, poor anchor condition multipliers, ballast fouling index multipliers, rail defect multipliers, joint multipliers, grade multipliers, speed change multipliers, braking distance multipliers, fair anchor condition multipliers, rail relay multipliers, and/or continuous welded rail multipliers. In one embodiment, the weighting module 124 can implement one or more weighting factors in conjunction with data collected by the data collection module 122 to provide a statistically weighted data foundation to the risk modeling system 200. In one embodiment, the data foundation can be considered as a myriad of data points having unique identifiers and/or characteristics that each have a particular location that can be associated with a railroad track. In another embodiment, the data foundation can be considered as a myriad of data points like those discussed above further having particular weighting factors associated therewith.

In one exemplary embodiment, the continuous welded rail risk modeling system 200 can include an asset association and modeling system 206. In one embodiment, the asset association and modeling system 206 can utilize data and/or weighted data from the data foundation system 204 to generate a risk model. For example, the asset association and modeling system 206 can associate data and weighted data with specific asset locations, such as fixed asset locations, tie cluster locations, and anchor locations. In another example, the asset association and modeling system 206 can utilize one or more proximity thresholds to determine whether data from the data foundation system 204 should be associated with particular asset locations. For example, the asset association and modeling system can identify locations of particular assets (such as fixed assets, tie clusters, anchors, etc.) and further determine a proximity threshold around such asset location. In another embodiment, the asset association and modeling system 206 can compare the locations of the data points generated with respect to the data foundation system 204 with the asset locations and associated proximity thresholds to determine whether one or more of the data points fall within and/or satisfy the proximity thresholds associated with the asset locations. In this manner, the asset association and modeling system 206 can determine whether certain data points should be associated with certain asset locations for the purpose of generating scores for areas in a railroad infrastructure.

In one exemplary embodiment, the asset association and modeling system 206 can implement a multi-layer modeling scheme by associating data collected by the data collection module 122 with associated weighting factor available via the weighting module 124 with particular asset locations. In one embodiment, the asset association and modeling system 206 can compare locations of assets with locations of particular data, and if the proximity of the particular data satisfies a proximity threshold associated with the location of the asset, the asset association and modeling system 206 can determine that the particular data should be included in a scoring algorithm to determine a scored area and/or a location score for that particular area. In one example, the asset association and modeling system 206 can implement a fixed asset layer, a tie cluster layer, and an anchor layer in the modeling scheme.

In another example, a plurality of data related to railroad infrastructure collected by the data collection module 122 and weighted by the weighting module 124 can be mapped against a plurality of railroad tracks, such that the asset association and modeling system 206 can determine the location of such data with respect to the railroad tracks. In one embodiment, the asset association an modeling system 206 can further utilize the data from the data foundation system 204 to further map asset locations (such as fixed asset locations, tie cluster locations, and anchor locations) with respect to the same railroad tracks. In this manner, the asset association and modeling system 206 can compare locations of assets with data points received from the data foundation system 204 to determine the proximity of such asset locations to the received data points. In one example, if the data points satisfy a proximity threshold with respect to the asset locations, the asset association and modeling system 206 can determine that such data points (that can be weighted by the weighting module 124) should be associated with such asset and utilized in a scoring calculation for a particular area related to the asset. In this manner, the asset association and modeling system 206 can associate data regarding a railroad infrastructure with particular assets of the railroad infrastructure.

In one embodiment, the asset association and modeling system 206 can include a fixed asset layer modeling system 208, a tie cluster layer modeling system 210, and an anchor layer modeling system 212. In one example, the fixed asset layer modeling system 208 can include a fixed asset relation module 126 and a fixed asset layer scoring module 132. In one embodiment, the fixed asset relation module 126 can utilize data from the data foundation system 204 and relate such data to fixed assets in a railroad infrastructure. For example, the fixed asset relation module 126 can receive and/or determine locations of fixed assets with respect to a railroad track. In another example, the fixed asset layer relation module 126 can utilize the fixed asset locations and compare such locations with locations of data points, such as those collected from the data foundation system 204. In another embodiment, the fixed asset relation module 126 can implement one or more proximity thresholds around fixed asset locations to determine whether data points received from the data foundation system 204 should be related with a given fixed asset location. For example, the fixed asset relation module 126 can compare a fixed asset location having one or more proximity thresholds associated therewith with one or more data point locations. In another embodiment, the fixed asset relation module 126 can determine that if data points satisfy the proximity threshold associated with a particular fixed asset location, such data points should be associated with and/or related to such fixed asset location. In this manner, be fixed asset relation module 126 can relate data, such as data from the data foundation system 204, to fixed assets in a railroad infrastructure.

In another embodiment, the fixed asset layer scoring module 132 can be configured to generate scores associated with particular fixed asset locations. For example, the fixed asset layer scoring module 132 can utilize fixed asset locations and the data related with such locations as determined by the fixed asset relation module 126 to determine a score for that particular area/location. In one embodiment, the fixed asset layer scoring module 132 can include data satisfying proximity threshold established with respect to a fixed asset location into a scoring calculation. For example, be fixed asset layer scoring module 132 can receive from the fixed asset relation module 126 that particular data points should be related with the fixed asset location. In another example, the fixed asset layers scoring module 132 can utilize these data points and associated weighting factors, along with the fixed asset itself and/or fixed asset weighting factor, to generate a score for a scored area. In one embodiment, the scored area can include the fixed asset location and an area defined by the proximity threshold related thereto.

In one exemplary embodiment, the fixed asset layer scoring module 132 can implement algorithms to generate scores for a particular area. In one embodiment, the algorithms can include numerical data related to the presence or lack thereof of particular events/characteristics such as those determined by the data foundation system 204. In another embodiment, the algorithms can include weighting factors implemented with the numerical data to modify statistical relevance of particular events/characteristics in generating a given risk model layer. For example, the follow weighting factors/multipliers discussed above with respect to the weighting module 124 can be used. In another embodiment, an equation such as the following can be implemented to determine a score for a particular area:

$$(\{[1*\beta+(\text{Rail Defects}*\alpha)+(\text{Joints}*\alpha)+(\text{Grade Counts}*\alpha)+(\text{Speed Changes}*\alpha)+(\text{CWR Work}*\alpha)+(\text{Yel Anchors}*\alpha)+(\text{Red Anchors}*\alpha)+ (\text{Rail Work}*\alpha)]*[\text{If BFI}\geq 1 \text{ then } \alpha, \text{ else } 1]\}*[\text{If BadTies}\geq 1 \text{ then } \alpha, \text{ else } 1])*[\text{If RailWork+DestressWork}\geq 1 \text{ then } 0, \text{ else } 1]$$

wherein α designates a weighting factor corresponding to a particular event/characteristic, and β designates a fixed asset weighting factor.

In one embodiment, the rail defects, joints, grade counts, speed changes, CWR work, yellow anchors, red anchors, rail work, BFI, bad ties, and destress work can all be represented numerically. For example, "joints" can indicate the number of joints that fall within a proximity threshold established and/or associated with a fixed asset location. In another example, "Yel Anchors" can refer to the number of anchors having a particular condition that satisfy a proximity threshold associated with the fixed asset location. In another example, "Speed Changes" can indicate whether or not a speed change with certain characteristics occurs within a proximity threshold of a fixed asset location, and/or the number of such speed changes occurring therein. In another example, "BadTies" can refer to the number of ties having a particular condition satisfying a proximity threshold associated with a fixed asset location. In one embodiment, if there is at least one tie of a particular condition satisfying such proximity threshold, the "Bad_Repl_Ties_Mult" can be substituted for α in the equation; otherwise, the number "1" can be used, such that the overall score can be unaffected, as no bad ties that could increase the risk of rail buckling are present. In another embodiment, the fixed asset layer modeling system 208 can generate a risk model that accounts for particular data points with respect to fixed asset locations.

In one exemplary embodiment, the tie cluster layer modeling system 210 can include a tie cluster relation module 128 and a tie cluster layer scoring module 134. In one embodiment, the tie cluster relation module 128 can utilize data from the data foundation system 204 and relate such data to tie clusters in a railroad infrastructure. For example, the tie cluster relation module 128 can receive data from the data foundation system 204 and such data can include data related to ties and condition of ties in a railroad infrastructure. In another example, the tie cluster relation module 128 can determine and/or identify clusters of ties having certain characteristics. For example, the tie cluster relation module 128 can determine locations and conditions of ties and group such ties together in a cluster. For example, ties can be in sequence on a railroad track. In one embodiment, the tie cluster relation module 128 can receive these locations of ties and determine which ties are proximate one another. In another embodiment, the tie cluster relation module 128 can further receive data regarding the condition of the ties in the railroad infrastructure. In another embodiment, the tie cluster relation module 128 can determine from the data if there are multiple ties in a row of a certain condition. In one embodiment, the tie cluster relation module can identify such ties as a tie cluster.

In one exemplary embodiment, the tie cluster relation module 128 can include a tie threshold. For example, the tie cluster relation module 128 can include a tie threshold requiring a particular number of ties to be in a particular condition and be within a particular distance of one another to be included in a tie cluster. In one embodiment, the tie cluster relation module 128 can require that a certain number of ties of particular condition must be all proximate one another to be considered a tie cluster. In another embodiment, the tie cluster relation module 128 can determine that if a particular number of ties are of a particular condition and are within a particular distance of one another, such ties can be included in a tie cluster. In another embodiment, the tie cluster relation module 128 can receive tie cluster indications from the data foundation system 204.

In one embodiment, the tie cluster relation module 128 can utilize data from the data foundation system 204 and relate such data to tie clusters in a railroad infrastructure. For example, the tie cluster relation module 128 can receive and/or determine locations of tie clusters with respect to a railroad track. In another example, the tie cluster layer relation module 128 can utilize the tie cluster locations and compare such locations with locations of data points, such as those collected from the data foundation system 204. In another embodiment, the tie cluster relation module 128 can implement one or more proximity thresholds around tie cluster locations to determine whether data points received from the data foundation system 204 should be related with a given tie cluster location. For example, the tie cluster relation module 128 can compare a tie cluster location having one or more proximity thresholds associated therewith with one or more data point locations. In another embodiment, the tie cluster relation module 128 can determine that if data points satisfy the proximity threshold associated with a particular tie cluster location, such data points should be associated with and/or related to such tie cluster location. In this manner, the tie cluster relation module 128 can relate data, such as data from the data foundation system 204, to tie clusters in a railroad infrastructure.

In another embodiment, the tie cluster layer scoring module 134 can be configured to generate scores associated with particular tie cluster locations. For example, the tie cluster layer scoring module 134 can utilize tie cluster locations and the data related with such locations as determined by the tie cluster relation module 128 to determine a score for that particular area/location. In one embodiment, the tie cluster layer scoring module 134 can include data satisfying proximity threshold established with respect to a tie cluster location into a scoring calculation. For example, be tie cluster layer scoring module 134 can receive from the tie cluster relation module 128 that particular data points should be related with the tie cluster location. In another example, the tie cluster layers scoring module 134 can utilize these data points and associated weighting factors, along with the tie cluster itself and/or tie cluster weighting factor, to generate a score for a scored area. In one embodiment, the scored area can include the tie cluster location and an area defined by the proximity threshold related thereto.

In one exemplary embodiment, the tie cluster layer scoring module 134 can implement algorithms to generate scores for a particular area. In one embodiment, the algorithms can include numerical data related to the presence or lack thereof of particular events/characteristics such as those determined by the data foundation system 204. In another embodiment, the algorithms can include weighting factors implemented with the numerical data to modify statistical relevance of particular events/characteristics in generating a given risk model layer. For example, the follow weighting factors/multiplies discussed above with respect to the weighting module 124 can be used. In another embodiment, an equation such as the following can be implemented to determine a score for a particular area:

({[If Asset Count=0 then β+((Rail Defects*α)+
(Joints*α)+(Grade Counts*α)+(Speed
Changes*α)+(CWR Work*α)+(Yel
Anchors*α)+(Red Anchors*α)+(Rail
Work*α))]*[If BFI≥1 then α, else 1]}*[If
BadTies≥1 then α, else 1])*[If RailWork+
DestressWork≥1 then 0, else 1]

({[If Asset Count>0 then β*((Fixed Assets*α)+(Rail
Defects*α)+(Joints*α)+(Grade Counts*α)+
(Speed Changes*α)+(CWR Work*α)+(Yel
Anchors*α)+(Red Anchors*α)+(Rail Work*
α))]*[If BFI≥1 then α, else 1]}*[If BadTies≥1
then α, else 1])*[If RailWork+DestressWork≥1
then 0, else 1]

wherein α can designate the corresponding weighting factor to a particular type of data, and β can designate a bad replacement tie weighting factor.

In one embodiment, the asset count, rail defects, joints, grade counts, speed changes, CWR work, yellow anchors, red anchors, rail work, BFI, bad ties, and destress work can all be represented numerically. For example, "joints" can indicate the number of joints that fall within a proximity threshold established and/or associated with a fixed asset location. In another example, "Yel Anchors" can refer to the number of anchors having a particular condition that satisfy a proximity threshold associated with the fixed asset location. In another example, "Speed Changes" can indicate whether or not a speed change with certain characteristics occurs within a proximity threshold of a fixed asset location, and/or the number of such speed changes occurring therein. In another example, "BadTies" can refer to the number of ties having a particular condition satisfying a proximity threshold associated with a fixed asset location. In one embodiment, if there is at least one tie of a particular condition satisfying such proximity threshold, the "Bad_Repl_Ties_Mult" can be substituted for a in the equation; otherwise, the number "1" can be used, such that the overall score can be unaffected, as no bad ties that could increase the risk of rail buckling are present. In another embodiment, if destress work was performed, the score can be set to zero, indicating that because the rail has already been destressed, the risk of rail buckling can be smaller. In another embodiment, the tie cluster layer modeling system 210 can generate a risk model that accounts for particular data points with respect to tie cluster locations.

In another example, the anchor layer modeling system 212 can include an anchor relation module 130 and an anchor layer scoring module 136. In one embodiment, the anchor relation module 130 can utilize data from the data foundation system 204 and relate such data to anchors/fasteners in a railroad infrastructure. In another embodiment, the anchor relation module 130 can utilize data from the data foundation system 204 and relate such data to anchors/fasteners in a railroad infrastructure that are in a particular condition, e.g. a fair and/or poor condition. For example, the anchor relation module 130 can receive and/or determine locations of anchors with respect to a railroad track. In another example, the anchor relation module 130 can receive and/or determine conditions of anchors. In another example, the anchor layer relation module 130 can utilize the anchor locations and compare such locations with locations of data points, such as those collected from the data foundation system 204. In another embodiment, the anchor relation module 130 can implement one or more proximity thresholds around anchor locations to determine whether data points received from the data foundation system 204 should be related with a given anchor location. For example, the anchor relation module 130 can compare an anchor location having one or more proximity thresholds associated therewith with one or more data point locations. In another embodiment, the anchor relation module 130 can determine that if data points satisfy the proximity threshold associated with a particular anchor location, such data points should be associated with and/or related to such anchor location. In this manner, be anchor relation module 130 can relate data, such as data from the data foundation system 204, to anchors in a railroad infrastructure.

In another embodiment, the anchor layer scoring module 136 can be configured to generate scores associated with particular anchor locations. For example, the anchor layer scoring module 136 can utilize anchor locations and the data related with such locations as determined by the anchor relation module 130 to determine a score for that particular area/location. In one embodiment, the anchor layer scoring module 136 can include data satisfying proximity threshold established with respect to an anchor location into a scoring calculation. For example, be anchor layer scoring module 136 can receive from the anchor relation module 130 that particular data points should be related with the anchor location. In another example, the anchor layer scoring module 136 can utilize these data points and associated weighting factors, along with the anchor itself and/or anchor weighting factor, to generate a score for a scored area. In one embodiment, the scored area can include the anchor location and an area defined by the proximity threshold related thereto.

In one exemplary embodiment, the anchor layer scoring module 136 can implement algorithms to generate scores for a particular area. In one embodiment, the algorithms can include numerical data related to the presence or lack thereof of particular events/characteristics such as those determined by the data foundation system 204. In another embodiment, the algorithms can include weighting factors implemented with the numerical data to modify statistical relevance of particular events/characteristics in generating a given risk model layer. For example, the following weighting factors/multipliers discussed above with respect to the weighting module 124 can be used. In another embodiment, an equation such as the following can be implemented to determine a score for a particular area:

$$(\{[\text{If Defect Priority='YEL' then Anchor\_Yel\_Mult,} \\ \text{Else Anchor\_Red\_Mult}] + (\text{Fixed Assets}*\alpha) + \\ (\text{Rail Defects}*\alpha) + (\text{Joints}*\alpha) + (\text{Grade} \\ \text{Counts}*\alpha) + (\text{Speed Changes}*\alpha) + (\text{CWR} \\ \text{Work}*\alpha) + (\text{Rail Work}*\alpha)]*[\text{If BFI} \geq 1 \text{ then } \alpha, \\ \text{else } 1]\}*[\text{If BadTies} \geq 1 \text{ then } \alpha, \text{ else } 1])*[\text{If} \\ \text{RailWork} + \text{DestressWork} \geq 1 \text{ then } 0, \text{ else } 1],$$

wherein α can designate a corresponding weighting factor for a particular data type.

In one embodiment, the anchor layer scoring module 136 can utilize an anchor condition (e.g., "Defect Priority") to determine which weighting factors should be implemented— e.g., one anchor condition (e.g. "YEL") can indicate one weighting factor, and another anchor condition (e.g. Red) can indicate another weighting factor. In one embodiment, the rail defects, joints, grade counts, speed changes, CWR work, yellow anchors, red anchors, rail work, BFI, bad ties, and distress work can all be represented numerically. For example, "Fixed Assets" can correspond to the number of fixed assets found within a proximity threshold of a particular anchor. In another example, "Rail Defects" can correspond to the number of indicated rail defects satisfying a proximity threshold associated with an anchor. In another example, "joints" can indicate the number of joints that fall within a proximity threshold established and/or associated with a fixed asset location. In another example, "Grade Counts" can indicate the number of sections within a proximity threshold of an anchor location in which the grade of the track satisfies a particular grade threshold (e.g., ±1%). In another example, "Speed Changes" can indicate whether or not a speed change with certain characteristics occurs within a proximity threshold of a fixed asset location, and/or the number of such speed changes occurring therein. In another example, "CWR Work" can indicate how many times CWR work has been performed within a proximity threshold of the anchor location; in another embodiment, "CWR Work" can be somewhat qualitative, in that if CWR work was performed anywhere within a proximity threshold of an anchor, "CWR Work" can, e.g., be set equal to 1, such that the CWR work weighting factor (e.g., "CWR_mult") can be implemented and provide appropriate statistical weight. In another example, "BadTies" can refer to the number of ties having a particular condition satisfying a proximity threshold associated with a fixed asset location. In another example, "Rail Work" can be similar to "CWR Work," in that it can represent how many times rail work was performed or alternatively be somewhat qualitative, e.g. be set to 1 if such work was performed. In another example, "BFI" can represent "ballast fouling index." In one embodiment, if the ballast fouling index satisfies an index threshold (e.g., BFI ≥40), the BFI weighting factor can lend statistical weight to the scoring algorithm. In one embodiment, if there is at least one tie of a particular condition satisfying such proximity threshold, the "Bad_Repl_Ties_Mult" can be substituted for a in the equation; otherwise, the number "1" can be used, such that the overall score can be unaffected, as no bad ties that could increase the risk of rail buckling are present. In another embodiment, these variables can be used interchangeably with respect to the fixed asset layer modeling system 208 and the tie cluster layer modeling system 210. In another embodiment, the anchor layer modeling system 212 can generate a risk model that accounts for particular data points with respect to anchor locations.

In one exemplary embodiment, the continuous welded rail risk modeling system 200 can include a model aggregation system 202. In one embodiment, the model aggregation system 202 can be configured to integrate the fixed asset layer risk model, the tie cluster layer risk model, and the anchor layer risk model generated by the fixed asset layer modeling system 208, tie cluster layer modeling system 210, and anchor layer modeling system 212, respectively. For example, the model aggregation system can be configured to implement one or more proximity thresholds associated with asset locations and/or score areas received from the modeling systems 208, 210, 212, and if such proximity thresholds are satisfied, the model aggregation system 202 can determine that such scored locations should be consolidated, and/or that the scores of such locations should be aggregated into a single score for the consolidated area. In another embodiment, the model aggregation system 202 can be configured to prioritize scored areas based on the scores generated, such as by consolidation performed by the model aggregation system 202. In another embodiment, the model aggregation system 202 can be configured to render a continuous welded rail risk model, such as with respect to an interactive track chart that can be in operable communication with the continuous welded rail risk modeling system 200.

In one embodiment, the model aggregation system 202 can include the consolidation module 138, the prioritization module 140, and the rendering module 142. In one embodiment, the consolidation module 138, the prioritization module 140, and the rendering module 142 can implement one or more algorithms to facilitate the consolidation of risk models generated by the asset association and modeling system 206, prioritizing areas of risk utilizing the consolidated risk models, and rendering the consolidated risk models and associated prioritization. In one embodiment, the consolidation module 138 can be configured to determine distances between asset locations having a particular score. For example, the consolidation module 138 can recognize fixed asset locations having particular scores assigned via the fixed asset layer scored module 132, Tie cluster locations having particular scores assigned via the tie cluster layer scoring module 134, and anchor locations having particular scores assigned by the anchor layer scoring module 136. In another example, the consolidation module 138 can determine proximity thresholds related to these asset locations. In one embodiment, the consolidation module 138 can determine that particular asset location scores and/or asset locations themselves should be consolidated for the purposes of the risk model if the proximity threshold is satisfied.

In one embodiment, the consolidation module 138 can facilitate the generation of a risk model that can emphasize areas of higher risk of rail buckling. For example, if two or more asset locations or within a certain proximity of one another, the consolidation module 138 can associate these asset locations with one another and determine that the scores assigned to these locations (such as by modules 132, 134, and 136) should also be consolidated. In this manner, the consolidation module 138 can emphasize larger swaths of track at a comparatively higher risk for rail buckling.

In one exemplary embodiment, the prioritization module 140 can utilize the asset location scores generated by any of modules 132, 134, 136 and/or the consolidation module 138 to prioritize which locations to address based on the generated and assigned scores. For example, the prioritization module 140 can compare scores of, e.g. a fixed asset location having a particular score add a tie cluster location having a particular score, to determine which location is that a higher risk of rail buckling. In another example, the prioritization module 140 can compare scores of consolidated areas (such as areas consolidated by the consolidation module 138) with scores of other consolidated areas and/or scores of asset locations that were not consolidated to determine which asset locations have a higher risk of rail buckling. In this manner, the prioritization module 140 can prioritize locations based on comparative risk.

In one exemplary embodiment, the rendering module 142 can utilize data and prioritization from the consolidation module 138 in the prioritization module 140 to render the continuous welded rail risk model. In one embodiment, the rendering module 142 can illustrate the prioritization of scored areas, including consolidated and non-consolidated scored areas, such as via color coding, visual indication, or any other suitable method of priority communication. For example, the rendering module 142 can be inoperable communication with an interactive track chart such that particular sections of track in the track chart can be emphasized and/or called out as having a particular score. Another example, the render module 142 can color code these areas to indicate which areas or at the highest risk of rail buckling.

Figure 3:
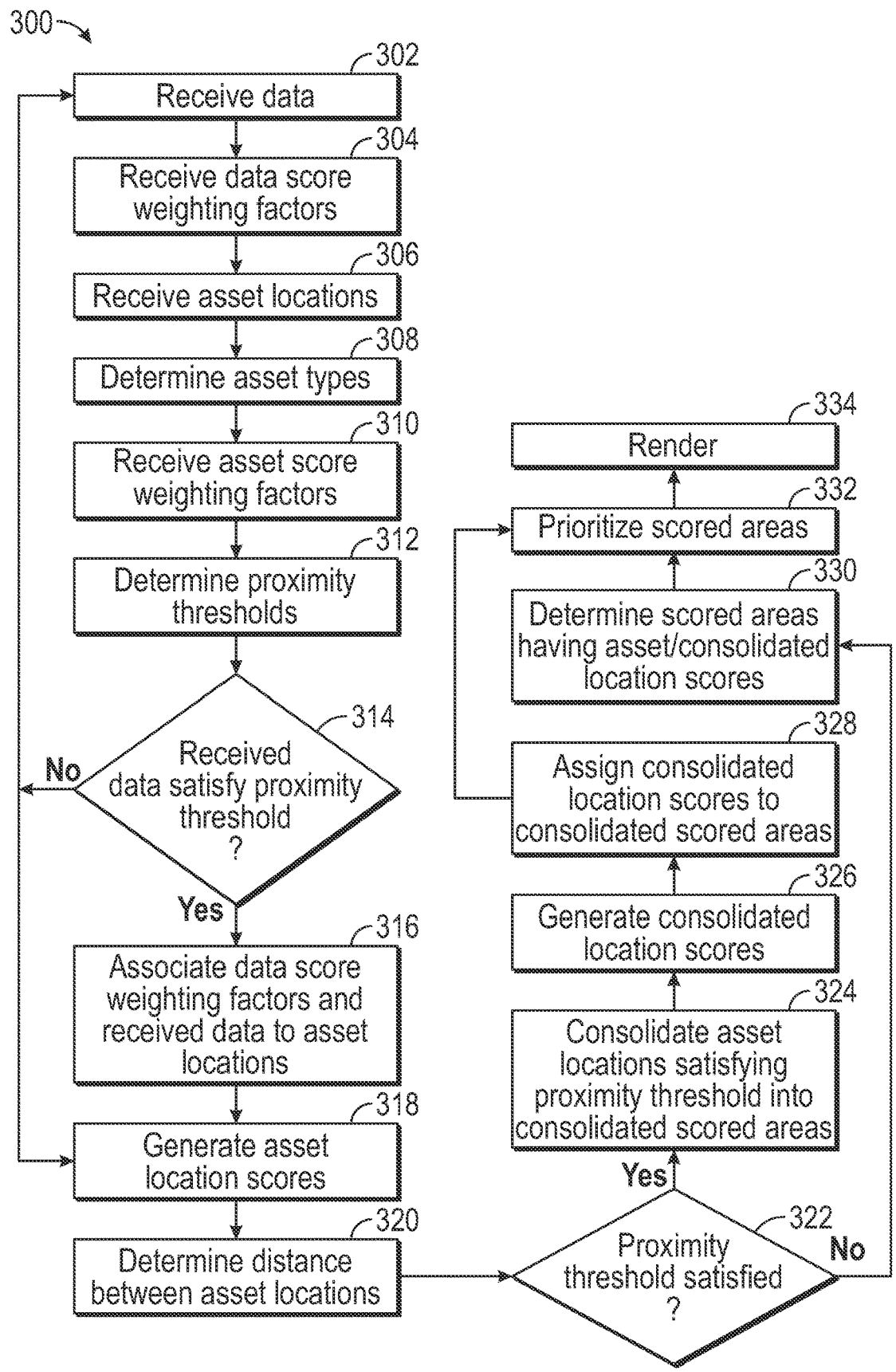
FIG. 3 illustrates a flowchart exemplifying an asset association and modeling system, in accordance with one or more exemplary embodiments of the present disclosure.

FIG. 3 illustrates a flow chart diagram 300 exemplifying control logic embodying features of an asset association and modeling system 300, in accordance with an exemplary embodiment of the present disclosure. The modeling control logic 300 can be implemented as an algorithm on a server (e.g., server 102), a machine learning module, or other suitable system. Additionally, the modeling control logic 300 can implement or incorporate one or more features of the continuous welded rail risk modeling system 200, including the data foundation system 204, asset association and modeling system 206, fixed asset layer modeling system 208, tie cluster layer modeling system 210, anchor layer modeling system 212, and model aggregation system 202. The modeling control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The modeling control logic 300 can leverage the ability of a computer platform to spawn multiple processes and threads by processing data simultaneously. The speed and efficiency of the modeling control logic 300 is greatly improved by instantiating more than one process to facilitate personnel safety. However, one skilled in the art of programming will appreciate that use of a single processing thread may also be utilized and is within the scope of the present disclosure.

The modeling control logic 300 process flow of the present embodiment begins at step 302, wherein the control logic 300 receives data. The data received at step 302 can include tie data, fixed asset data, anchor data, grade data, ballast data, joint data, rail equipment incident data, rail defects data, velocity data, maintenance data, rail removal data, curve data, distressing work data, or any other data suitable to facilitate the modeling of risk for rail buckling. In one embodiment, the data received in step 302 can be numerical data, qualitative data, or any other suitable form of data. In another embodiment, the received data can include location information indicating at which position relative to a railroad track the received data originated from and/or is associate with. For example, the data received at step 302 can include a specific position, such as coordinates or other position. In another embodiment, the data received at step 302 can be data related to a specific position. For example, the data can be regarding a section/segment of railroad track, and/or the environment therearound. The control logic 300 then proceeds to step 304.

At step 304, the control logic 300 can receive data score weighting factors. For example, the control logic 300 can be an operable communication with a database (such as database 104) that can store weighting factors that can be specific too particular data, such as data received in step 302. In one embodiment, the weighting factors can be similar to those discussed with respect to the weighting module 124. In another embodiment, the weighting factors can include multipliers, e.g. numbers that can be multiplied with data types that can vary by the data type with which they are to be multiplied. In another example, the weighting factors can include any other mechanisms or factors with which the control logic 300 can statistically weight data received, e.g. data received at step 302. The control logic 300 then proceeds to step 306.

At step 306, the control logic 300 can receive asset locations. For example, the control logic 300 can receive fixed asset locations, tie cluster locations, and/or anchor locations. In another embodiment, the control logic 300 can receive locations of any other assets on the road, including trains, buildings, or any other railroad constituents. The control logic 300 then proceeds to step 308.

At step 308, the control logic 300 can determine the asset types. For example, the control logic 300 can determine the types of assets associated with the locations received at step 306. For example, the control logic 300 can determine that a particular asset whose location was received at step 306 is, e.g., a fixed asset, a tie cluster, or an anchor. In another embodiment, the control logic 300 can determine that an asset is any other type of asset, such as a vehicle, a bungalow, or any other railroad asset. The control logic 300 then proceeds to step 310.

At step 310, the control logic 300 can receive asset score weighting factors. For example, the control logic 300 can receive weighting factors associated with particular assets. In one embodiment, the control logic 300 can receive weighting factors associated with a particular types of assets as were determined in step 308. In another embodiment, the control logic 300 can receive weighting factors associated with fixed assets, tie clusters, and/or anchors. For example, the weighting factors receive at step 310 can be multipliers. In another embodiment, the weighting factors can be any other factors or other mechanisms that the control logic 300 can utilize to statistically weight asset-related data and/or scores. The control logic 300 then proceeds to step 312.

At step 312, the control logic can determine proximity thresholds. For example, the control logic can determine proximity thresholds associated with the asset locations received in step 306. In another embodiment, the control logic 300 can determine, for example, one or more tiers of proximity thresholds. In one example, a first tier of proximity thresholds determined at step 312 can be used by the control logic 300 to determine which data received at 302 should be associated with particular assets whose locations were received at step 306. For example, the first tier of proximity thresholds, if satisfied by the locations of the received data at step 302, can indicate to the control logic 300 that such data points should be associated with particular asset locations whose proximity thresholds are satisfied. In another embodiment, a second tier of proximity thresholds can include proximity thresholds around scored areas that can indicate to the control logic 300 whether particular scored areas should be consolidated. In another embodiment, the control logic 300 can implement any number of proximity thresholds suitable to enable the control logic 300 to associate received data with particular asset locations and/or consolidate particular scored areas with one another via determination of proximity threshold satisfaction. The control logic 300 then proceeds to step 314.

At step 314, the control logic 300 can determine whether received data satisfies one or more proximity thresholds. For example, the control logic can determine whether the data received at step 302 satisfies the one or more proximity thresholds determined at step 312. In one embodiment, the control logic 300 can utilize a first tier of proximity thresholds to determine whether data received at step 302 should be associated with particular asset locations received it step 306. If the control logic 300 determines that the received data does not satisfy the proximity threshold, the control logic 300 then proceeds to steps 302 and 318. If the control logic 300 determines that the received data satisfies the proximity threshold, the control logic 300 then proceeds to step 316.

At step 316, the control logic 300 can associate the data score weighting factors and received data with asset locations. For example, the control logic 300 can associate the data score weighting factors received in step 304 and the received data from step 302 with asset locations received at step 306. For example, the control logic 300 can determine which weighting factors received at step 304 should be associated with which data received at step 302. In one embodiment, the control logic 300 can utilize data-type-specific weighting factors. In another embodiment, the control logic 300 can examine the types of data received in step 302 and compare such data with the weighting factors received at step 304 to determine which weighting factors should be utilized with which data. In another embodiment, the control logic 300 can associate the data received at step 302 with the asset locations received at step 306 if the received data satisfies the proximity thresholds of the asset locations. For example, the control logic 300 can determine that the location of the received data at step 302 satisfies the proximity threshold of the asset locations and thereby determines that such data should be associated with such locations. The control logic 300 then proceeds to step 318.

At step 318, the control logic 300 can generate asset location scores. For example, the control logic 300 can utilize the asset locations received at step 306, the determined asset types from step 308, and the received asset score weighting factors from step 310 to facilitate the generation of asset location scores. In another embodiment, the control logic 300 can employ received data satisfying the proximity thresholds along with the asset types associated with such proximity thresholds to determine and/or generate and asset location score. For example, the control logic 300 can determine that if data received satisfies the proximity threshold associated with a particular asset location, the received data, along with the asset type, should be employed to generate the asset location score. For example, those data points satisfying the proximity threshold can be implemented in a mathematical equation and statistically weighted with appropriate weighting factors. In another example, the asset type and associated asset score weighting factors can further be implemented in the same mathematical equation and statistically weighted to generate an asset location score. In another embodiment, if there is no received data satisfying a proximity threshold associated with a particular asset location, the control logic 300 can generate an asset location score using, for example, only the asset type and associated asset score weighting factor. In this manner, the control logic 300 can generate asset location scores that can account for multiple risk factors in a given railroad infrastructure. For example, the control logic 300 can generate a score that considers all of the data satisfying proximity threshold with respect to a particular asset location. In another example, if there is no such data, the score generated for a particular asset location can carry only the significance lent to it by the particular asset type and associated weighting factor. The control logic 300 then proceeds to step 320.

At step 320, the control logic 300 can determine distances between asset locations. For example, the control logic 300 can determine distances between the asset locations received in step 306. In one embodiment, the control logic can determine a track distance between the asset locations. For example, the asset locations received in step 306 can be associated with a railroad track, and the control logic 300 can determine a distance and/or length of track between two given asset locations. In another embodiment, the control logic 300 can compare the asset locations received at step 306 and determine how far each is from the other, such as via GPS and/or any other suitable mechanism. The control logic 300 then proceeds to step 322.

At step 322, the control logic 300 can determine whether a proximity threshold is satisfied. For example, the control logic 300 can determine whether the distance between any two or more given asset locations satisfies a proximity threshold. In another example, the proximity threshold at step 322 can be considered a second tier proximity threshold. For example, the control logic 300 can implement and/or analyze the proximity threshold and step 322 after generating asset location scores, such as at step 318. In another embodiment, the proximity threshold examined by the control logic 300 at step 322 can refer to a magnitude of distance between any given asset locations. In one embodiment, if a distance between any two given asset locations is less than or equal to the magnitude of the proximity threshold, the control logic 300 can determine that the proximity threshold is satisfied. If the control logic 300 determines that the proximity threshold is not satisfied, the control logic 300 then proceeds to step 330. If the control logic 300 determines that the proximity threshold is satisfied, the control logic 300 then proceeds to step 324.

At step 324, the control logic 300 can consolidate asset locations satisfying a proximity threshold into consolidated scored areas. For example, the control logic 300 can determine that asset locations within a certain proximity of one another (such as within a proximity that satisfies the proximity threshold) should be consolidated into unionized areas. For example, the control logic 300 can determine that two or more asset locations satisfying the proximity threshold can be consolidated into a single consolidated scored area. In one embodiment, the control logic 300 can determine that such asset location satisfying the proximity threshold should be considered as singular larger areas for the purposes of the risk model to be generated. The control logic 300 then proceeds to step 326.

At step 326, the control logic 300 can generate consolidated location scores. For example, the control logic can implement the asset location scores generated at step 318 and consolidate such scores together for such asset locations satisfying the proximity threshold. In another example, the control logic 300 can aggregate the asset location scores if the asset locations satisfy the proximity threshold with respect to one another. In another embodiment, the control logic 300 can generate consolidated location scores reflecting a larger scored area corresponding to two or more asset locations satisfying the proximity threshold. The control logic then proceeds to step 328.

At step 328, the control logic 300 can assign the consolidated location scores to the consolidated scored areas. In one embodiment, the control logic 300 can assign the consolidated location scores generated in step 326 to the consolidated scored areas determined at step 324. For example, the control logic 300 can determine that the asset locations consolidated into the scored areas at step 324 each had a corresponding asset location score prior to the consolidation. In another example, the control logic 300 can generate the consolidated location scores using these asset location scores at step 326, and by associating the consolidated scored area with the specific asset locations serving as constituents to the consolidated scored area, the control logic 300 can determine that a given consolidated location score should be assigned to a given consolidated scored area. The control logic 300 then proceeds to step 330.

At step 330, the control logic 300 can determine scored areas having asset/consolidated location scores. In one embodiment, the control logic 300 can consider one or more of the identified asset locations, each with an asset location score, and if the asset location has not been consolidated with another asset location previously in the process flow, the control logic 300 can determine that the asset location can be a scored area having the asset location score. In another embodiment, the control logic 300 can consider all of the identified asset locations, each with an asset location score, and further consider all of the consolidated scored areas, and determine that the asset locations not consolidated can each be a scored area and each can have an asset location score, and further determine that each of the consolidated scored areas can be a scored area having a consolidated location score. In this manner, the control logic 300 can determine scored areas for use in a risk model. The control logic 300 then proceeds to step 332.

At step 332, the control logic 300 can prioritize scored areas using the location scores. For example, the control logic 300 can compare the asset location scores and the consolidated location scores to determine priority. In one embodiment, each of the scored areas determined in step 330 can include a location score (e.g., an asset location score and/or a consolidated location score). In another embodiment, the control logic 300 can compare location scores corresponding to the scored areas to determine priority. In one example, a scored area having a higher location score can be deemed by the control logic 300 to have a higher priority. For example, a higher location score can indicate a higher level of risk of rail buckling for a particular scored area. In another embodiment, the control logic 300 can perform any other suitable comparison to utilize the data and/or location scores to prioritize scored areas relative to one another. In one embodiment, the control logic 300 can implement one or more score thresholds to facilitate prioritization of the scored areas. For example, the control logic 300 can implement a first score threshold, such that if a location score associated with a particular scored area is of a certain magnitude, the scored area can be assigned a certain priority level. In another embodiment, the control logic can implement a second score threshold, such that if a location score associated with a particular scored area is of a certain magnitude (e.g. lower than the first scored threshold but higher than the second score threshold), the scored area can be assigned a different priority level.

In another embodiment, the control logic 300 can prioritize scored areas based on sizes of the scored areas. For example, the control logic 300 can determine a size of a particular scored area, such as by considering an asset location along with a proximity threshold (such as the proximity threshold considered in step 314). In another embodiment, the control logic 300 can consider sizes of two or more asset locations consolidated into a consolidated scored area and use such sizes to determine a size of the consolidated scored area. In another embodiment, the control logic 300 can receive an asset location (such as at step 306) and such location can include a scored area size. In another embodiment, a scored area size can be defined by asset locations, proximity thresholds, and/or consolidations thereof. In one example, the control logic 300 can implement one or more size thresholds to assist and/or facilitate the prioritization of scored areas as related to other scored areas. In one embodiment, a size threshold can include a certain magnitude, such as can be measured in feet, meters, miles, or any other unit of distance, such as a unit of distance squared. For example, a scored area having a particular area magnitude can be compared with a size threshold, and if the scored area has a particular area magnitude, the scored area can satisfy the size threshold.

In another embodiment, the control logic 300 can prioritize scored areas based on scored area size and/or location score associated with the scored area. For example, scored areas can be prioritized by location score, and then further prioritized by scored area size. In one embodiment, a collection of scored areas having location scores within a particular range (and/or satisfying one or more particular score thresholds) can be prioritized under a first priority assignment. In another example, such scored areas having the first priority assignment can be further prioritized by size of the scored area. For example, scored areas satisfying a particular score threshold and falling within a particular size range (and/or satisfying one or more particular size thresholds) can be prioritized within the first priority assignment, such that a collection of scored areas having particular location scores can be further prioritized. The control logic 300 then proceeds to step 334.

At step 334, the control logic 300 can render. For example, the control logic 300 can render a risk model indicating prioritization of scored areas resulting from step 332. For example, the control logic 300 can generate a tabulated rendering of data received and/or generated during the process flow and sort the data according to location scores. In one embodiment, the control logic 300 can indicate that scored areas having higher location scores can require a higher priority than scored areas having lower location scores. For example, the scored areas having higher location scores can be highlighted, colored, bolded, or emphasized in any other manner suitable to indicate that such areas having higher location scores require a higher priority. In another embodiment, the control logic 300 can render the risk model in an interactive track chart. For example, the control logic can indicate, on a track chart, asset locations, asset types, proximity thresholds, asset location scores, consolidated location scores, scored areas, and/or priority of each scored area. In one embodiment, the control logic 300 can indicate on an interactive track chart which scored areas fall within a particular range priority. For example, the control logic 300 can include one or more priority threshold Associated with the location scores the scored area, and subsequently prioritize groups of scored areas based on location score. In one embodiment, the control logic 300 can indicate which scored areas meet such priority criteria, such as by rendering an interactive track chart with such scored areas emphasized, e.g. via color coding, bolding, or any other suitable mechanism of emphasis. In another embodiment, the control logic 300 can further indicate via rendering the size of the scored areas. For example, with respect to an interactive track chart, the control logic 300 can implement shapes differing in size superimposed on the interactive track chart as an indication of a size of a scored area. In another embodiment, such shapes can further be color coded to indicate which score threshold is satisfied by the scored area as a further indication of risk. The control logic 300 can then terminate or repeat any of the aforementioned steps.

In one embodiment, steps 302, 304, 306, 308, and 310 can correspond to the data foundation system 204. In another embodiment, steps 314, 316, 318, and 320 can correspond to the asset association and modeling system 206 (and/or the fixed asset layer modeling system 208, tie cluster layer modeling system 210, and/or anchor layer modeling system 212). In another embodiment, steps 322, 324, 326, 328, 330, 332, and 334 can correspond to the model aggregation system 202.

Figure 4:
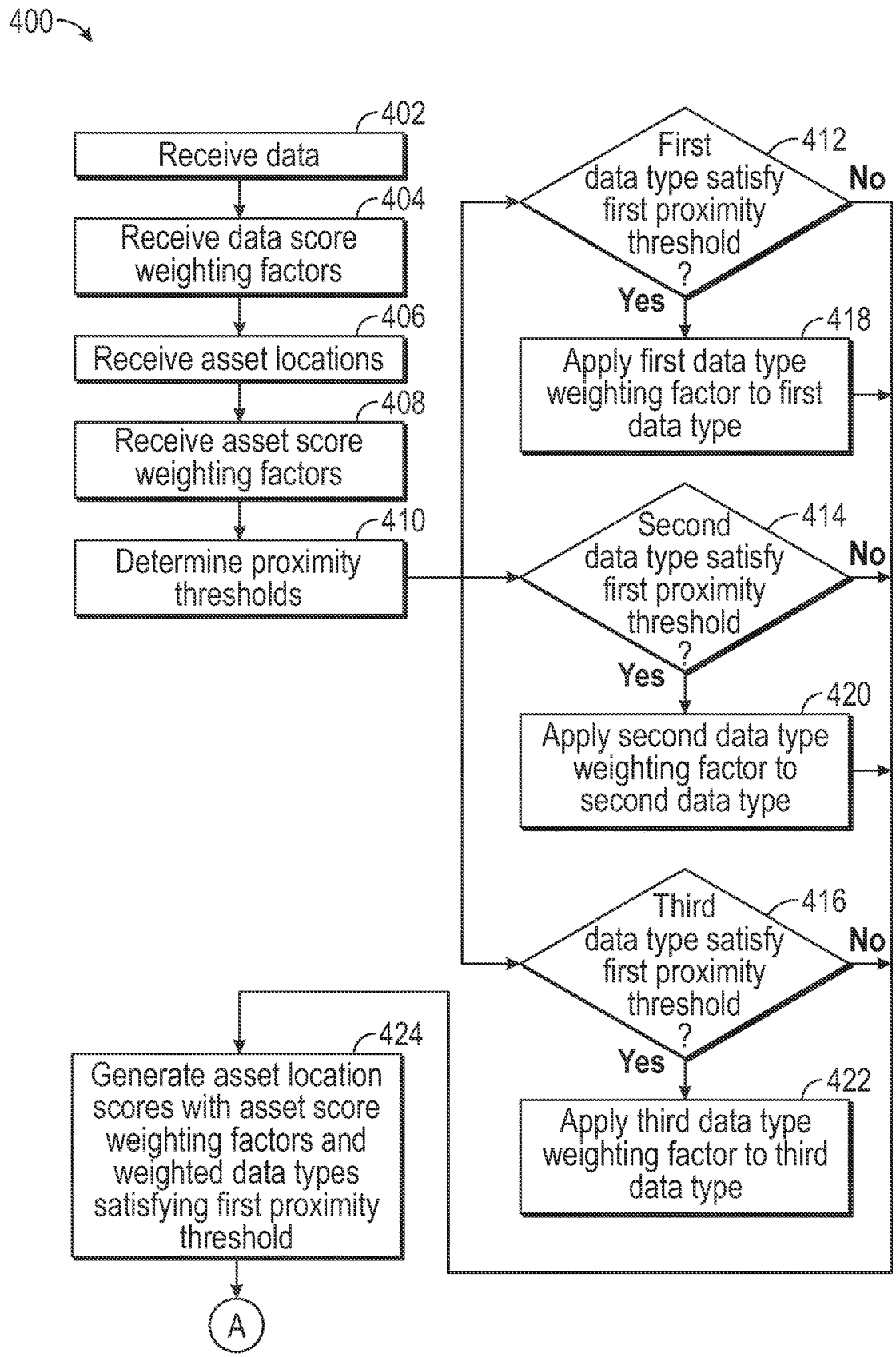
FIG. 4 illustrates a flowchart exemplifying a buckling risk assessment system, in accordance with one or more exemplary embodiments of the present disclosure.
Figure 4:
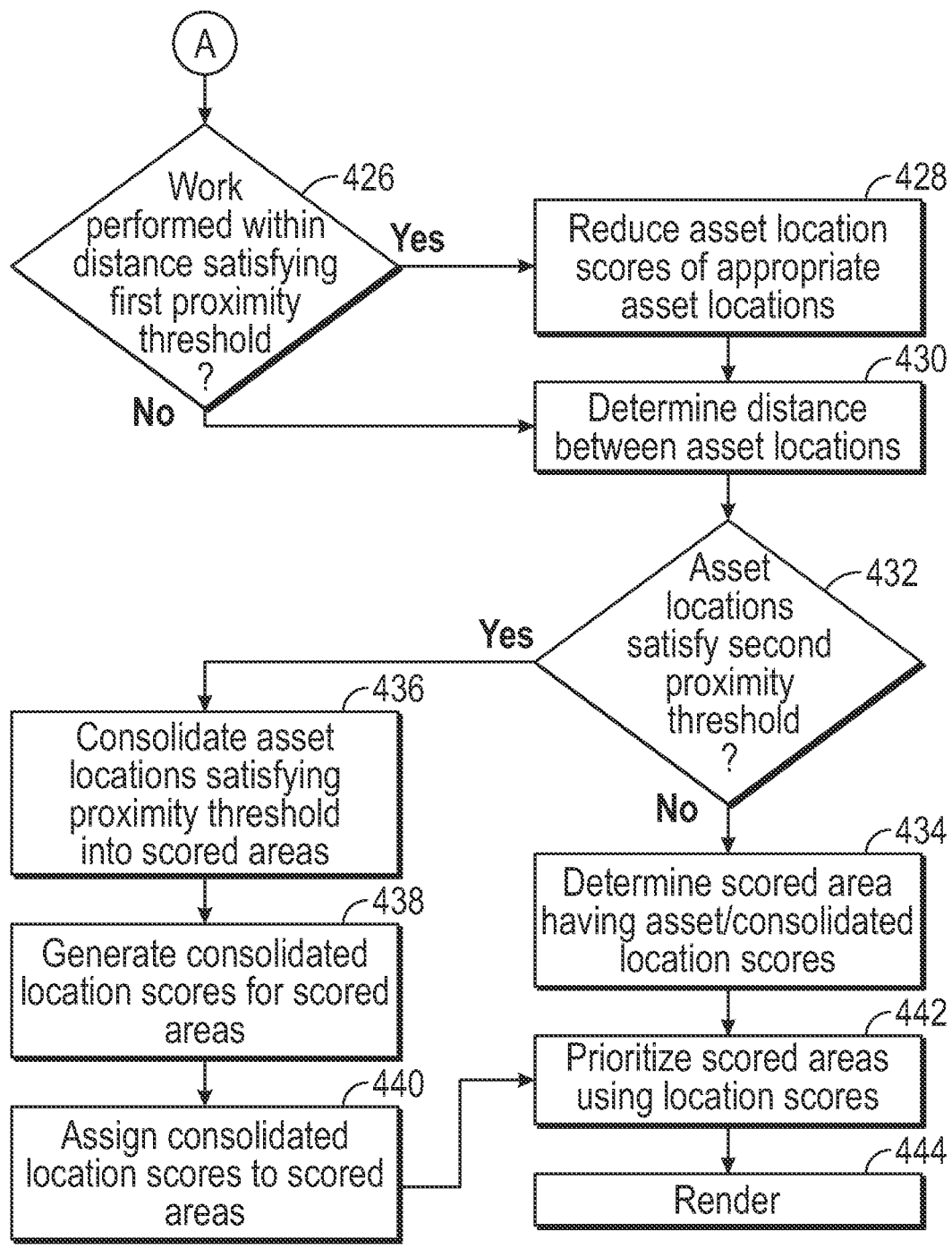

FIG. 4 illustrates a flow chart diagram 400 exemplifying control logic embodying features of a buckling risk assessment system 400, in accordance with an exemplary embodiment of the present disclosure. The assessment control logic 400 can be implemented as an algorithm on a server (e.g., server 102), a machine learning module, or other suitable system. Additionally, the assessment control logic 400 can implement or incorporate one or more features of the continuous welded rail risk assessment system 200, including the data foundation system 204, asset association and assessment system 206, fixed asset layer assessment system 208, tie cluster layer assessment system 210, anchor layer assessment system 212, and model aggregation system 202. The assessment control logic 400 can be achieved with software, hardware, an application programming interface (API), a network connection, a network transfer protocol, HTML, DHTML, JavaScript, Dojo, Ruby, Rails, other suitable applications, or a suitable combination thereof.

The assessment control logic 400 can leverage the ability of a computer platform to spawn multiple processes and threads by processing data simultaneously. The speed and efficiency of the assessment control logic 400 is greatly improved by instantiating more than one process to facilitate personnel safety. However, one skilled in the art of programming will appreciate that use of a single processing thread may also be utilized and is within the scope of the present disclosure.

The assessment control logic 400 process flow of the present embodiment begins at step 402, wherein the control logic 400 receives data. The data received at step 402 can include tie data, fixed asset data, anchor data, grade data, ballast data, joint data, rail equipment incident data, rail defects data, velocity data, maintenance data, rail removal data, curve data, distressing work data, or any other data suitable to facilitate the modeling of risk for rail buckling. In one embodiment, the data received in step 402 can be numerical data, qualitative data, or any other suitable form of data. In another embodiment, the received data can include location information indicating at which position relative to a railroad track the received data originated from and/or is associate with. For example, the data received at step 402 can include a specific position, such as coordinates or other position. In another embodiment, the data received at step 402 can be data related to a specific position. For example, the data can be regarding a section/segment of railroad track, and/or the environment therearound. The control logic 400 then proceeds to step 404.

At step 404, the control logic 400 can receive data score weighting factors. For example, the control logic 400 can be an operable communication with a database (such as database 104) that can store weighting factors that can be specific too particular data, such as data received in step 402. In one embodiment, the weighting factors can be similar to those discussed with respect to the weighting module 124. In another embodiment, the weighting factors can include multipliers, e.g. numbers that can be multiplied with data types that can vary by the data type with which they are to be multiplied. In another example, the weighting factors can include any other mechanisms or factors with which the control logic 400 can statistically weight data received, e.g. data received at step 402. The control logic 400 then proceeds to step 406.

At step 406, the control logic 400 can receive asset locations. For example, the control logic 400 can receive fixed asset locations, tie cluster locations, and/or anchor locations. In another embodiment, the control logic 400 can receive locations of any other assets on the road, including trains, buildings, or any other railroad constituents. For example, assets in this model can be static and physical components of the track structure. Alternatively, assets in this model can be dynamic. The control logic 400 then proceeds to step 408.

At step 408, the control logic 400 can receive asset score weighting factors. For example, the control logic 400 can receive weighting factors associated with particular assets. In one embodiment, the control logic 400 can receive weighting factors associated with a particular type of assets as were determined in step 308. In another embodiment, the control logic 400 can receive weighting factors associated with fixed assets, tie clusters, and/or anchors. For example, the weighting factors receive at step 408 can be multipliers. In another embodiment, the weighting factors can be any other factors or other mechanisms that the control logic 400 can utilize to statistically weight asset-related data and/or scores. The control logic 400 then proceeds to step 410.

At step 410, the control logic can determine proximity thresholds. For example, the control logic can determine proximity thresholds associated with the asset locations received in step 406. In another embodiment, the control logic 400 can determine, for example, one or more tiers of proximity thresholds. In one example, a first tier of proximity thresholds determined at step 410 can be used by the control logic 400 to determine which data received at 402 should be associated with particular assets whose locations were received at step 406. For example, the first tier of proximity thresholds, if satisfied by the locations of the received data at step 402, can indicate to the control logic 400 that such data points should be associated with particular asset locations whose proximity thresholds are satisfied.

In another embodiment, a second tier of proximity thresholds can include proximity thresholds around scored areas that can indicate to the control logic 400 whether particular scored areas should be consolidated. In another embodiment, the control logic 400 can implement any number of proximity thresholds suitable to enable the control logic 400 to associate received data with particular asset locations and/or consolidate particular scored areas with one another via determination of proximity threshold satisfaction. The control logic 400 then proceeds to steps 412, 414, and 416.

At step 412, the control logic 400 can determine whether a first data type satisfies a first proximity threshold. For example, the control logic can determine a type of data received step 402. For example, the data can be tie data, anchor data, asset data, or any other data related to railroad infrastructure in accordance with the principles of the present disclosure. In one embodiment, the first data type can have a particular location, such as a location associated and/or related to a railroad track. In another embodiment, the control logic 400 can determine whether the first type of data satisfies a first proximity threshold with respect to an asset location. In one embodiment, the control logic 400 can generate proximity thresholds associated with asset locations, and if the first data type is within a certain distance from a given asset location, the first data type can satisfy the first proximity threshold with respect to such asset location. If the control logic 400 determines that the first type of data does not satisfy the first proximity threshold, the control logic 400 then proceeds to step 424. If the control logic 400 determines that the first type of data satisfies the first proximity threshold the control logic 400 proceeds to step 418.

At step 418, the control logic 400 can apply the first data type weighting factor to the first data type. For example, the control logic 400 can associate the data received in step 402 with the data score weighting factors received in step 404. In one embodiment, the control logic 400 can receive data score weighting factors that can be specific to data types, such as the first data type, the second data type, and/or the third data type. In one embodiment, the data score weighting factors can be similar to those discussed with respect to the weighting module 124. In one example, the control logic 400 can apply the first data type weighting factor to the first data type by associating the appropriate weighting factor with the first data type, such as in a mathematical equation. In another example, the control logic 400 can include both the first data type weighting factor and the first data type, both represented as numerical quantities, in a particular position in a mathematical equation, such that the first data type weighting factor can affect the first data type quantitative representation. The control logic 400 then proceeds to step 424.

At step 414, the control logic 400 can determine whether a second data type satisfies the first proximity threshold. For example, the control logic can determine a type of data received step 402. For example, the data can be tie data, anchor data, asset data, or any other data related to railroad infrastructure in accordance with the principles of the present disclosure. In one embodiment, the second data type can have a particular location, such as a location associated and/or related to a railroad track. In another embodiment, the control logic 400 can determine whether the second type of data satisfies the first proximity threshold with respect to an asset location. In one embodiment, the control logic 400 can generate proximity thresholds associated with asset locations, and if the second data type is within a certain distance from a given asset location, the second data type can satisfy the first proximity threshold with respect to such asset location. If the control logic 400 determines that the second type of data does not satisfy the first proximity threshold, the control logic 400 then proceeds to step 424. If the control logic 400 determines that the second type of data satisfies the first proximity threshold the control logic 400 proceeds to step 420.

At step 420, the control logic 400 can apply the second data type weighting factor to the second data type. For example, the control logic 400 can associate the data received in step 402 with the data score weighting factors received in step 404. In one embodiment, the control logic 400 can receive data score weighting factors that can be specific to data types, such as the first data type, the second data type, and/or the third data type. In one embodiment, the data score weighting factors can be similar to those discussed with respect to the weighting module 124. In one example, the control logic 400 can apply the second data type weighting factor to the second data type by associating the appropriate weighting factor with the second data type, such as in a mathematical equation. In another example, the control logic 400 can include both the second data type weighting factor and the second data type, both represented as numerical quantities, in a particular position in a mathematical equation, such that the second data type weighting factor can affect the second data type quantitative representation. The control logic 400 then proceeds to step 424.

At step 416, the control logic 400 can determine whether a third data type satisfies the first proximity threshold. For example, the control logic can determine a type of data received step 402. For example, the data can be tie data, anchor data, asset data, or any other data related to railroad infrastructure in accordance with the principles of the present disclosure. In one embodiment, the third data type can have a particular location, such as a location associated and/or related to a railroad track. In another embodiment, the control logic 400 can determine whether the third type of data satisfies the first proximity threshold with respect to an asset location. In one embodiment, the control logic 400 can generate proximity thresholds associated with asset locations, and if the third data type is within a certain distance from a given asset location, the third data type can satisfy the first proximity threshold with respect to such asset location. If the control logic 400 determines that the third type of data does not satisfy the first proximity threshold, the control logic 400 then proceeds to step 424. If the control logic 400 determines that the third type of data satisfies the first proximity threshold the control logic 400 proceeds to step 422.

At step 422, the control logic 400 can apply the third data type weighting factor to the third data type. For example, the control logic 400 can associate the data received in step 402 with the data score weighting factors received in step 404. In one embodiment, the control logic 400 can receive data score weighting factors that can be specific to data types, such as the first data type, the second data type, and/or the third data type. In one embodiment, the data score weighting factors can be similar to those discussed with respect to the weighting module 124. In one example, the control logic 400 can apply the third data type weighting factor to the third data type by associating the appropriate weighting factor with the second data type, such as in a mathematical equation. In another example, the control logic 400 can include both the third data type weighting factor and the third data type, both represented as numerical quantities, in a particular position in a mathematical equation, such that the third data type weighting factor can affect the third data type quantitative representation. The control logic 400 then proceeds to step 424.

At step 424, the control logic 400 can generate asset location scores. For example, the control logic can generate an asset location score for each asset location received at step 406. In another embodiment, the control logic 400 can generate asset location scores using the asset weighting factors and the weighted datatypes satisfying the first proximity threshold. For example, the control logic 400 can receive asset score weighting factors at step 408 and associate such assets score weighting factors with the assets whose locations were received at step 406. In another embodiment, the control logic 400 can calculate and asset location score by considering the asset type, the asset score weighting factor, and any data type (such as the first, second, and/or third data type) and associated data type weighting factor that satisfied the first proximity threshold. In one example, the control logic 400 can implement a mathematical equation (such as the equations discussed with respect to the asset association and modeling system 206) that Represents received data such as the asset type, asset score weighting factor, and weighted data satisfying the first proximity threshold as numerical quantities And further manipulates the data to generate and asset location score. In this manner, the control logic 400 can account for a myriad of different data types in assessing a risk of rail buckling in association with a specific asset location. In another embodiment, the control logic 400 can further determine that if received data does not satisfy the first proximity threshold, such received data and/or associated weighting factors should not be considered and calculating an asset location score. The control logic 400 then proceeds to step 426.

At step 426, the control logic 400 can determine whether work was performed within a distance satisfying the first proximity threshold. In one embodiment, work performed on the track can indicate that stress on a rail was relieved, mitigating a risk of rail buckling. In another embodiment, work performed on the track can indicate that a risk of rail buckling was addressed, such as by removing rail sections and/or adding new sections as needed. In another embodiment, the control logic 400 can determine whether an indication that work was performed within a distance from the asset location satisfying the first proximity threshold is present. If the control logic 400 determines that work was not performed within a distance satisfying the first proximity threshold, the control logic then proceeds to step 430. If the control logic 400 determines that work performed within a distance satisfying the first proximity threshold with respect to a particular asset location, the control logic 400 then proceeds at 428

At step 428, the control logic 400 can reduce asset location scores of appropriate asset locations. For example, the control logic 400 can determine which asset location proximity thresholds were satisfied with respect to work performed. In one embodiment, if work was performed within the first proximity threshold associated with a specific asset location, such work can abrogate the risk of rail buckling, such that the control logic 400 can determine that an asset location score can be reduced. The control logic then proceeds to step 430.

At step 430, the control logic 400 can determine one or more distances between asset locations. For example, the control logic 400 can utilized the asset locations received in step 406 and compare such locations to determine a distance between such locations. And one embodiment, the control logic 400 can determine a track distance between a set of asset locations. In another embodiment, the control logic can receive data points related to asset locations and can implement such data points and calculating the distance between set asset locations. The control logic then proceeds to step 432.

At step 432, the control logic 400 can determine whether asset locations satisfy a second proximity threshold. For example, the control logic 400 can determine proximity thresholds with respect to asset locations. And one body meant, in particular magnitude of distance between two or more asset locations can be defined such that if that magnitude is met or exceeded between two or more asset locations, the second proximity threshold can be determined by the control logic 400 to be satisfied. In another embodiment, the distance determined and step 430 can be compared to the second proximity threshold, such that the control logic 400 can determine whether the distance between the asset locations satisfies the second proximity threshold. If the control logic 400 determines that the second proximity threshold is not satisfied, the control logic 400 then proceeds to step 434. If the control logic 400 determines that the second proximity threshold is satisfied, the control logic 400 then proceeds to step 436.

At step 434, the control logic 400 can determine scored areas having asset/consolidated location scores. In one embodiment, the control logic 400 can consider one or more of the identified asset locations, each with an asset location score, and if the asset location has not been consolidated with another asset location previously in the process flow, the control logic 400 can determine that the asset location can be a scored area having the asset location score. In another embodiment, the control logic 400 can consider all of the identified asset locations, each with an asset location score, and further consider all of the consolidated scored areas, and determine that the asset locations not consolidated can each be a scored area and each can have an asset location score, and further determine that each of the consolidated scored areas can be a scored area having a consolidated location score. In this manner, the control logic 400 can determine scored areas for use in a risk model. The control logic 400 then proceeds to step 436.

At step 436, the control logic 400 can consolidate asset locations satisfying a proximity threshold into consolidated scored areas. For example, the control logic 400 can determine that asset locations within a certain proximity of one another (such as within a proximity that satisfies the proximity threshold) should be consolidated into unionized areas. For example, the control logic 400 can determine that two or more asset locations satisfying the proximity threshold can be consolidated into a single consolidated scored area. In one embodiment, the control logic 400 can determine that such asset location satisfying the proximity threshold should be considered as singular larger areas for the purposes of the risk model to be generated. The control logic 400 then proceeds to step 438.

At step 438, the control logic 400 can generate consolidated location scores. For example, the control logic can implement the asset location scores generated at step 424 and consolidate such scores together for such asset locations satisfying the proximity threshold. In another example, the control logic 400 can aggregate the asset location scores if the asset locations satisfy the proximity threshold with respect to one another. In another embodiment, the control logic 400 can generate consolidated location scores reflecting a larger scored area corresponding to two or more asset locations satisfying the proximity threshold. The control logic then proceeds to step 440.

At step 440, the control logic 400 can assign the consolidated location scores to the consolidated scored areas. In one embodiment, the control logic 400 can assign the consolidated location scores generated in step 438 to the consolidated scored areas determined at step 436. For example, the control logic 400 can determine that the asset locations consolidated into the scored areas at step 436 each had a corresponding asset location score prior to the consolidation. In another example, the control logic 400 can generate the consolidated location scores using these asset location scores at step 438, and by associating the consolidated scored area with the specific asset locations serving as constituents to the consolidated scored area, the control logic 400 can determine that a given consolidated location score should be assigned to a given consolidated scored area. The control logic 400 then proceeds to step 442.

At step 442, the control logic 400 can prioritize scored areas using the location scores. For example, the control logic 400 can compare the asset location scores and the consolidated location scores to determine priority. In one embodiment, each of the scored areas determined in step 440 can include a location score (e.g., an asset location score and/or a consolidated location score). In another embodiment, the control logic 400 can compare location scores corresponding to the scored areas to determine priority. In one example, a scored area having a higher location score can be deemed by the control logic 400 to have a higher priority. For example, a higher location score can indicate a higher level of risk of rail buckling for a particular scored area. In another embodiment, the control logic 400 can perform any other suitable comparison to utilize the data and/or location scores to prioritize scored areas relative to one another. In one embodiment, the control logic 400 can implement one or more score thresholds to facilitate prioritization of the scored areas. For example, the control logic 400 can implement a first score threshold, such that if a location score associated with a particular scored area is of a certain magnitude, the scored area can be assigned a certain priority level. In another embodiment, the control logic can implement a second score threshold, such that if a location score associated with a particular scored area is of a certain magnitude (e.g. lower than the first scored threshold but higher than the second score threshold), the scored area can be assigned a different priority level.

In another embodiment, the control logic 400 can prioritize scored areas based on sizes of the scored areas. For example, the control logic 400 can determine a size of a particular scored area, such as by considering an asset location along with a proximity threshold (such as the proximity threshold considered in steps 412, 414, 416, and/or 432). In another embodiment, the control logic 400 can consider sizes of two or more asset locations consolidated into a consolidated scored area and use such sizes to determine a size of the consolidated scored area. In another embodiment, the control logic 400 can receive an asset location (such as at step 406) and such location can include a scored area size. In another embodiment, a scored area size can be defined by asset locations, proximity thresholds, and/or consolidations thereof. In one example, the control logic 400 can implement one or more size thresholds to assist and/or facilitate the prioritization of scored areas as related to other scored areas. In one embodiment, a size threshold can include a certain magnitude, such as can be measured in feet, meters, miles, or any other unit of distance, such as a unit of distance squared. For example, a scored area having a particular area magnitude can be compared with a size threshold, and if the scored area has a particular area magnitude, the scored area can satisfy the size threshold.

In another embodiment, the control logic 400 can prioritize scored areas based on scored area size and/or location score associated with the scored area. For example, scored areas can be prioritized by location score, and then further prioritized by scored area size. In one embodiment, a collection of scored areas having location scores within a particular range (and/or satisfying one or more particular score thresholds) can be prioritized under a first priority assignment. In another example, such scored areas having the first priority assignment can be further prioritized by size of the scored area. For example, scored areas satisfying a particular score threshold and falling within a particular size range (and/or satisfying one or more particular size thresholds) can be prioritized within the first priority assignment, such that a collection of scored areas having particular location scores can be further prioritized. The control logic 400 then proceeds to step 444.

At step 444, the control logic 400 can render. For example, the control logic 400 can render a risk model indicating prioritization of scored areas resulting from step 442. For example, the control logic 400 can generate a tabulated rendering of data received and/or generated during the process flow and sort the data according to location scores. In one embodiment, the control logic 400 can indicate that scored areas having higher location scores can require a higher priority than scored areas having lower location scores. For example, the scored areas having higher location scores can be highlighted, colored, bolded, or emphasized in any other manner suitable to indicate that such areas having higher location scores require a higher priority. In another embodiment, the control logic 400 can render the risk model in an interactive track chart. For example, the control logic can indicate, on a track chart, asset locations, asset types, proximity thresholds, asset location scores, consolidated location scores, scored areas, and/or priority of each scored area. In one embodiment, the control logic 400 can indicate on an interactive track chart which scored areas fall within a particular range priority. For example, the control logic 400 can include one or more priority threshold Associated with the location scores the scored area, and subsequently prioritize groups of scored areas based on location score. In one embodiment, the control logic 400 can indicate which scored areas meet such priority criteria, such as by rendering an interactive track chart with such scored areas emphasized, e.g. via color coding, bolding, or any other suitable mechanism of emphasis. In another embodiment, the control logic 400 can further indicate via rendering the size of the scored areas. For example, with respect to an interactive track chart, the control logic 400 can implement shapes differing in size superimposed on the interactive track chart as an indication of a size of a scored area. In another embodiment, such shapes can further be color coded to indicate which score threshold is satisfied by the scored area as a further indication of risk. The control logic 400 can then terminate or repeat any of the aforementioned steps.

In one embodiment, steps 402, 404, 406, 408, 418, 420, and 422 can correspond to the data foundation system 204. In another embodiment, steps 412, 414, 416, 424, 426, and 428 can correspond to the asset association and modeling system 206 (and/or the fixed asset layer modeling system 208, tie cluster layer modeling system 210, and/or anchor layer modeling system 212). In another embodiment, steps 430, 432, 434, 436, 438, 440, 442, and 44 can correspond to the model aggregation system 202.

Figure 5:
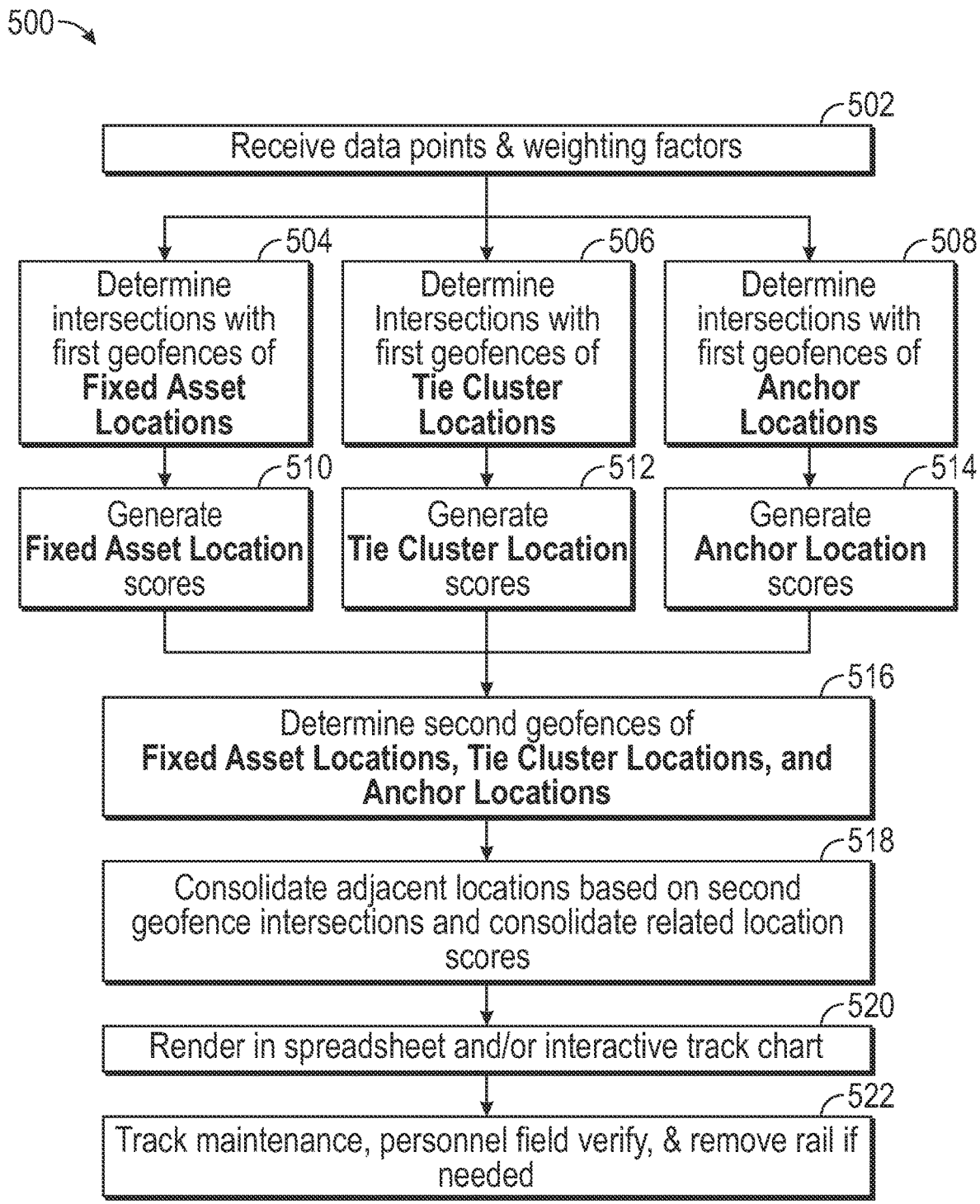
FIG. 5 illustrates a method of multilayer risk modeling, in accordance with one or more exemplary embodiments of the present disclosure.

FIG. 5 illustrates a flow chart diagram 500 exemplifying control logic embodying features of a method of multi-layer risk modeling 500, in accordance with an exemplary embodiment of the present disclosure. The multi-layer risk modeling control logic 500 can be implemented as an algorithm on a server (e.g., server 102), a machine learning module, or other suitable system. Additionally, the multi-layer risk modeling control logic 500 can implement or incorporate one or more features of the continuous welded rail risk assessment system 200, including the data foundation system 204, asset association and assessment system 206, fixed asset layer assessment system 208, tie cluster layer assessment system 210, anchor layer assessment system 212, and model aggregation system 202. The multi-layer risk modeling control logic 500 can be achieved with software, hardware, an application programming interface (API), a network connection, a network transfer protocol, HTML, DHTML, JavaScript, Dojo, Ruby, Rails, other suitable applications, or a suitable combination thereof.

The multi-layer risk modeling control logic 500 can leverage the ability of a computer platform to spawn multiple processes and threads by processing data simultaneously. The speed and efficiency of the multi-layer risk modeling control logic 500 is greatly improved by instantiating more than one process to facilitate personnel safety. However, one skilled in the art of programming will appreciate that use of a single processing thread may also be utilized and is within the scope of the present disclosure.

The multi-layer risk modeling control logic 500 process flow of the present embodiment begins at step 502, wherein the control logic 500 receives data points and weighting factors. For example, data points can correspond to tie data, curve data, speed data, or any other relevant data in accordance with one or more embodiments of the present disclosure. In another embodiment, the control logic 500 can receive weighting factors, such as weighting factors discussed with respect to the weighting module 124. The control logic 500 then proceeds to steps 504, 506, and 508.

At step 504, the control logic 500 can determine which data points intersect with first geofences generated around fixed asset locations. In one embodiment, the control logic 500 can establish geofences around fixed asset locations. For example, the first geofences can be linear or circular. Another embodiment, when the control logic 500 receives data in step 502, the control logic can determine whether the location of such data points fall within the geofences generated around the fixed asset locations. In another embodiment, fixed asset locations can include bridge locations, crossover locations, overpasses, or any other assets that remains stationary in a railroad infrastructure. The control logic then proceeds to step 510.

At step 506, the control logic 500 can determine which data points intersect with first geofences associated with tie cluster locations. For example, the control logic 500 can determine tie cluster locations, such as by receiving tie data including tie locations and tie conditions, and determining clusters of ties having a certain condition. In another embodiment, the control logic 500 can generate geofences around these tie clusters, and determine whether the data points received at step 502 intersect and/or fall within the geofences around that tie cluster location. The control logic then proceeds to step 516.

At step 508, the control logic 500 can determine which data points intersect with first geofences around anchor locations. For example, the control logic 500 can receive data regarding anchors and conditions of anchors and a railroad infrastructure. In another embodiment, the control logic 500 can generate geofences around these locations and compare positions of the data points received in step 502 to determine whether such data points fall within the geofence. The control logic then proceeds to step 514.

At step 510, the control logic 500 can generate fixed asset location scores. For example, the control logic 500 can utilize the determination made in step 504 with respect to which data points fall within the first geofence associated with the fixed asset locations. In another embodiment, the control logic 500 can use these data points within the geofence in generating a fixed asset location score. In another embodiment, the control logic 500 can use the weighting factors, as well as the data points falling within the first geofence, in generating the fixed asset location score. In another embodiment, the control logic 500 can use a weighting factor associated with the fixed asset locations in conjunction with other data to generate fixed asset location scores. In another embodiment, the control logic 500 can generate a fixed asset location score in accordance with the principles of the present disclosure. The control logic 500 then proceeds to step 516.

At step 512, the control logic 500 can generate tie cluster location scores. For example, the control logic 500 can utilize the determination made in 506 to identify the data points that fall within the first geofence around tie cluster locations. In another embodiment, the control logic 500 can utilize these data points and generating a tie cluster location score. For example, the data points can be represented numerically such that the data within the first geofence with respect to the tie clusters can be implemented in a mathematical equation to calculate a score. In another embodiment, the control logic 500 can utilize the weighting factors received to step 502 as well as numerical representations of tie cluster locations in generating a tie cluster location score. The control logic 500 then proceeds to step 516.

At step 514, the control logic can generate anchor location scores. For example, the control logic 500 can utilize the determination made in step 518 to identify which data points should be included in a score generation. In one embodiment, the control logic can use the data points intersecting the first geofence with respect to the anchor locations as well as the weighting factors received to step 502 to generate an anchor location score. In another embodiment, the control logic 500 can generate an anchor location score in accordance with the principles of the present disclosure.

At step 516, the control logic can determine second geofences with respect to the fixed asset locations, tie cluster locations, and anchor locations. For example, after generating the fixed asset location scores, tie location scores, and anchor location scores facilitated by the first geofences, the control logic 500 can then generate second geofences around fixed asset locations, tie cluster locations, and anchor locations. In one embodiment, the second geofences can be linear and include a larger area than the first geofences. In another embodiment, the second geofences can be circular and include a larger radius than the first geofences. And another embodiment, the second geofences can be the same size as the first geofences. In another embodiment, the second geofences can have linear distances or radii between 0.1 and 1 miles. In another embodiment, the second geofences can be of any suitable size to enable the control logic 500 to determine which fixed asset locations, tie cluster locations, and anchor locations should be consolidated for the purposes of the multi-layer risk model. The control logic 500 then proceeds to step 518.

At step 518, the control logic 500 can consolidate adjacent locations based on the second geofence intersections and consolidate the related location scores. In one embodiment, if a geofence around a location intersects with a geofence around another location, the control logic 500 can determine that the locations can be consolidated. In another embodiment, if a location is within a geofence generated around another location, the control logic 500 can determine that the locations can be consolidated. In another embodiment, the control logic 500 can consolidate the location scores of one or more locations being consolidated. For example, if a second geofence around a fixed asset location intersects a second geofence around a tie cluster location, the control logic 500 can determine that the fixed asset location and the tie cluster location should be consolidated, such as into a scored area. In another example, if the control logic 500 consolidates such fixed asset location and tie cluster location, the control logic 500 can consolidate the location scores of those two respective areas. For example, the control logic 500 can add the scores to one another, aggregate the scores, multiply the scores, or perform any other mathematical function to consolidate the scores of the two locations being consolidated. The control logic then proceeds to step 520.

At step 520, the control logic can render into a spreadsheet and/or an interactive track chart. In one embodiment, a multilayer risk model can be rendered to reflect types of data received, how location scores were determined, which locations were consolidated, which locations have the highest and or lowest score, and which locations should be prioritized, such as for maintenance work prioritization. In another example, the control logic 500 can render the multilayer risk model and an interactive track chart such that sections of track are emphasized according to particular scores of such locations and/or such consolidated locations. The control logic 500 then proceeds to step 522.

At step 522, the control logic 500 can receive an indication that track maintenance was performed. For example, if a crew is dispatched to perform maintenance on the track, an indication can be generated and received by the control logic 500. In another embodiment, personnel can check a particular location, such as a location addressed and any of the previous process flow steps, such as to verify whether the rail has buckled at a particular location. In another embodiment, if such buckling has occurred, personnel can remove a section of rail to mitigate the buckling. In another embodiment, if such distressing work occurs, the control logic 500 can determine that a score of an area affected by such a distressing work can be reduced, such as to reflect that a risk of rail buckling is lower because such distressing work was performed. The control logic 500 can then terminate or repeat any of the aforementioned steps.

In one embodiment, step 502 can correspond to the data foundation system 204. In another embodiment, steps 504 and 510 can correspond to, e.g., the fixed asset layer modeling system 208 of the asset association and modeling system 206. In another embodiment, steps 506 and 512 can correspond to, e.g., the tie cluster layer modeling system 208 of the asset association and modeling system 206. In another embodiment, steps 508 and 514 can correspond to, e.g., the anchor layer modeling system 208 of the asset association and modeling system 206. In another embodiment, steps 516, 518, 520, and 522 can correspond to the model aggregation system 202.

Figure 6:
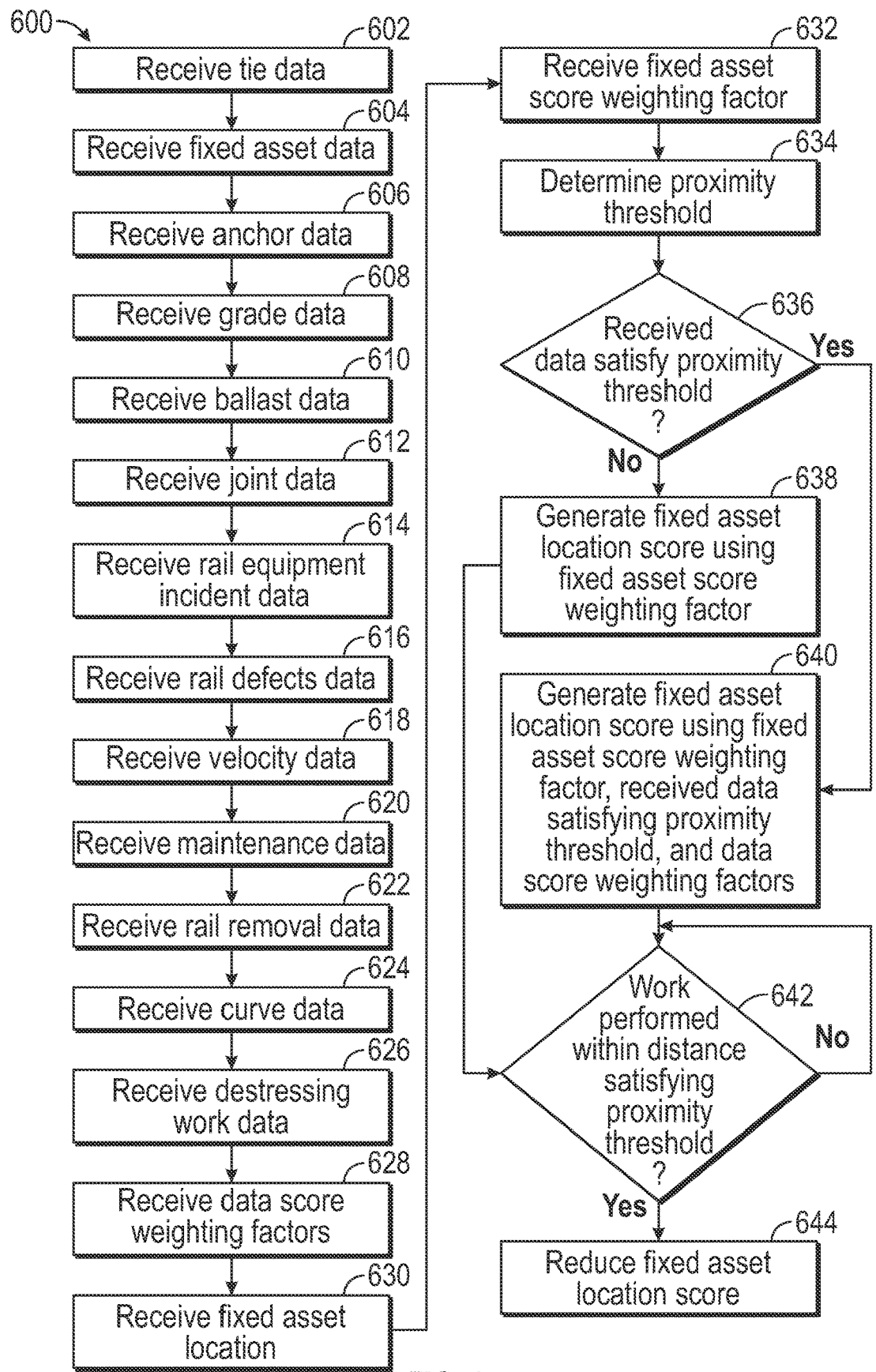
FIG. 6 illustrates a flowchart exemplifying a fixed asset modeling system, in accordance with one or more exemplary embodiments of the present disclosure.

FIG. 6 illustrates a flow chart diagram 600 exemplifying control logic embodying features of a fixed asset modeling system 600, in accordance with an exemplary embodiment of the present disclosure. The fixed asset modeling control logic 400 can be implemented as an algorithm on a server (e.g., server 102), a machine learning module, or other suitable system. Additionally, the fixed asset modeling control logic 600 can implement or incorporate one or more features of the continuous welded rail risk assessment system 200, including the data foundation system 204, asset association and assessment system 206, fixed asset layer assessment system 208, tie cluster layer assessment system 210, anchor layer assessment system 212, and model aggregation system 202. The fixed asset modeling control logic 600 can be achieved with software, hardware, an application programming interface (API), a network connection, a network transfer protocol, HTML, DHTML, JavaScript, Dojo, Ruby, Rails, other suitable applications, or a suitable combination thereof.

The fixed asset modeling control logic 600 can leverage the ability of a computer platform to spawn multiple processes and threads by processing data simultaneously. The speed and efficiency of the fixed asset modeling control logic 600 is greatly improved by instantiating more than one process to facilitate personnel safety. However, one skilled in the art of programming will appreciate that use of a single processing thread may also be utilized and is within the scope of the present disclosure.

The fixed asset modeling control logic 600 process flow of the present embodiment begins at step 602, wherein the control logic can receive tie. In one embodiment, the data received in steps 602-632 and be receive in any order. In one embodiment, the data received at step 602 can include tie data. For example, the control logic 600 can include tie locations, tie conditions, tie compositions, or any other data related to ties in a railroad infrastructure. In another embodiment, the control logic 600 can receive data related to positions of ties relative to one another. the control logic 600 then proceeds to step 604.

At step 604, the control logic 600 can receive fixed asset data. For example, the control logic can receive types of fixed assets that are present in the railroad infrastructure. In another embodiment, the control logic 600 can receive identification information related to fixed assets. The control logic then proceeds to step 606.

At step 606, the control logic can receive anchor data. For example, the control logic can receive data related to anchor location. In another embodiment, the control logic 600 can receive data related to an anchored condition. For example, the control logic can receive information with respect to specific anchors, such as whether an anchor is in a "yellow" condition or a "red" condition. In another embodiment, the control logic 600 can receive data indicating an anchor composition, type, or style. In another embodiment, the control logic 600 can receive data related to individual anchors. The control logic 600 then proceeds to step 608.

At step 608, the control logic 600 can receive grade data. For example, the control logic 600 can receive information regarding a slope of one or more segments of track in a railroad infrastructure. In one embodiment, the control logic can receive a specific magnitude of grade, such as can be represented as a percentage. In one embodiment, the control logic 600 can receive an indication that a grade exceeding a certain grade threshold is present at a particular portion of track or not. In another embodiment, the control logic 600 can receive data regarding a particular grade and in particular segment of track and determine whether such grade satisfies a grade threshold. The control logic 600 then proceeds to step 610.

At step 610, the control logic 600 can receive ballast data. In one embodiment, ballast data can correspond to the ballast make up, ballast maintenance, ballast compaction, or any other data related to the ballast. In one example, the control logic 600 can receive a ballast fouling index related to a particular area. In another embodiment, the control logic can receive an indication that the ballast fouling index satisfies a particular ballast fouling index threshold. In another embodiment, the control logic 600 can receive ballast data, calculated ballast fouling index, and compare the ballast fouling index to an index threshold. In another embodiment, the control logic can receive a balanced fouling index and determine whether the ballast fouling index satisfies a ballast fouling index threshold. The control logic 600 then proceeds to step 612.

At step 612, the control logic 600 can receive joint data. For example, the control logic can receive data related to the number of joints, the location of joints, the type of joints, the integrity of joints, or any other data related to joints in a railroad infrastructure. In one embodiment, joints can be junctures between rail segments. In another embodiment, joints can be insulators that electrically separate track segments from one another, such as for signaling purposes. The control logic then proceeds to step 614.

At step 614, the control logic 600 can receive rail equipment incident data. For example, the control logic 600 can receive a history of incidents related to rail equipment on the track. For example, the control logic 600 can receive data related to train or other vehicle derailments, crashes on the tracks, or any other type of rail equipment incident that can occur on railroad tracks. The control logic 600 then proceeds to step 616.

At step 616, the control logic 600 can receive rail defect data. For example, the control logic 600 can be an operable communication with the database that can store information related to defection of rail. For example, the control logic 600 can receive data related to defects caused by temperature, wheel sliding, repairs, or any other types of defects. In another embodiment, the control logic 600 can receive an indication of whether a rail defect is present or not. The control logic 600 then proceed step 618.

At step 618, the control logic 600 can receive velocity data. In one embodiment, the velocity data can include mandated speeds for particular segments of track. In another embodiment, the velocity data can include braking distances for particular segment of track. In another embodiment, velocity data can include velocity of vehicles traveling in particular segments of track. The control logic 600 then proceeds to step 620.

At step 620, the control logic 600 can receive maintenance data. For example, the control logic 600 can receive data regarding maintenance performed on a track. In one embodiment, maintenance data can include maintenance history for particular segments, such as the most recent work performed at that particular track segment. The control logic 600 then proceeds to step 622.

At step 622, the control logic 600 can receive rail removal data. For example, the control logic 600 in received data regarding whether rail was removed from a particular segment of track, such as to distress the track. The control logic 600 then proceeds to step 624.

At step 624, the control logic 600 can receive curve data. For example, the control logic 600 can receive data with respect to a curvature in a track, such as the extent of the curvature, the location of the curvature, the angle of the curvature, or any other data related to a curve in the track. The control logic 600 then proceeds to step 626.

At step 626, the control logic 600 can receive destressing (relieving) work data. For example, the control logic 600 can receive indications of whether distressing work was performed at a particular location in a railroad infrastructure. The control logic 600 then proceeds to step 628.

At step 628, the control logic 600 can receive data score weighting factors. For example, the control logic 610 receive a weighting factor for each of the data types received in steps 602-626. In another embodiment, the control logic 600 can associate the received data score weighting factors with each of the data types received in process flow 600. The control logic 600 then proceeds to step 630.

At step 630, the control logic 600 can receive fixed asset locations. For example, the control logic 600 can receive locations of fixed assets in railroad infrastructure, such as with respect to specific sections of railroad track. In one embodiment, the control logic 600 can associate the fixed asset data received at step 604 with the fixed asset locations received 630. The control logic 600 then proceeds to step 632

At step 632, the control logic 600 can receive fixed asset score weighting factors. For example, the control logic 600 can receive a weighting factor that can be implemented with and/or associated with fixed assets. In another embodiment, the control logic 600 can receive different weighting factors for different fixed assets. For example, the control logic 600 can receive a weighting factor that can be specific to a bridge; in another embodiment, the control logic 600 can receive a weighting factor that can be specific to a crossover. In another embodiment, the same weighting factor can be used for all fixed assets. The control logic then proceeds to step 634.

At step 634, the control logic 600 can determine a proximity threshold. For example, the control logic 600 can determine a proximity threshold with respect to one or more fixed asset locations. In one embodiment, the proximity threshold can include a geofence generated around a fixed asset location. In one embodiment, the outer boundary of the geofence can represent the proximity threshold, such that if a data point crosses, intersects, and/or is within the outer boundary, such data point can satisfy the proximity threshold. The control logic 600 then proceeds to step 636.

At step 636, the control logic 600 can determine whether the data received satisfies the proximity threshold. For example, the control logic 600 can determine whether the data received in any of steps 608 through 626 satisfied the proximity threshold determined at step 634. In one example, the control logic 600 can determine whether any of the data points received in any of the previous steps fall within the geofence is generated around the fixed asset locations. In one embodiment, data points that fall within the geofence can be considered to satisfy the proximity threshold. In another embodiment, the data points that do not fall within the geofence can be considered to not satisfy the proximity threshold. If the control logic 600 determines that received data satisfies the proximity threshold, the control logic 600 then proceeds to step 638. If the control logic 600 determines that received data does not satisfy the proximity threshold, the control logic 600 then proceeds to step 640.

At step 638, the control logic 600 can generate fixed asset location scores using the fixed asset score weighting factor. For example, if no received data satisfies the proximity threshold, the control logic 600 can generate the fixed asset location score using only the fixed asset score weighting factor. In one embodiment, the fixed asset location score can be equal to the weighting factor. For example, the presence of fixed assets can be indicated by tickers, set versus not-set indications, the number one, or any other representation indicating that a fixed asset is present. In another embodiment, if received data does not fall within the proximity threshold established around the fixed asset location, the control logic 600 can determine that the fixed asset location score should be equal to fixed asset score weighting factor and be unchanged by other data because such data does not satisfy the proximity threshold. The control logic 600 then proceeds to step 642.

At step 640, the control logic 600 can generate fixed asset location scores using fixed asset score weighting factors, received data satisfying the proximity threshold, and data score weighting factors. In one embodiment, the control logic 600 can utilize the determination made in step 636 to identify the received data that falls within the proximity thresholds of particular fixed asset locations and subsequently use such received data to calculate a fixed asset location score. In another example, the control logic 600 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 600 can determine that such incident equals one. If a second incident happens later down in the segment, the control logic 600 can determine that the second incident is also equal to one. In another embodiment, the control logic 600 can then determine whether one or both of the rail incidents occurred within a proximity threshold associated with a particular fixed asset location. If each of the incidents occurred within such proximity threshold, the control logic 600 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 600 can implement a similar strategy for each of the types of data received in any of the previous process flow steps. In this manner, the control logic 600 can generate fixed asset location scores. In another embodiment, the fixed asset location scores generated in step 638 can indicate that no other risk factors are present near a fixed asset location having such fixed asset location scores. In another embodiment, the fixed asset location scores generated in step 640 can indicate that one or more additional risk factors are within a proximity threshold of a fixed asset location, meaning that such risk factors increase a fixed asset location score because of such proximity. The control logic 600 then proceeds to step 642.

At step 642, the control logic 600 can determine whether work was performed within a distance satisfying the first proximity threshold. In one embodiment, the control logic 600 can determine whether destressing work was performed within the first proximity threshold. For example, the control logic 600 can receive an indication that such work was performed within the first proximity threshold. In another embodiment, the control logic 600 can receive indications of work locations and subsequently compare such locations to the fixed asset locations and associated proximity thresholds to determine which work locations (if any) satisfy which proximity thresholds associated with particular fixed asset locations. If the control logic 600 determines that work was performed within a distance of satisfying the proximity threshold of a particular fixed asset location, the control logic 600 then proceeds to step 644. If the control logic 600 determines that no work was performed within a distance satisfying the proximity threshold of a particular fixed asset location, the control logic 600 then proceeds to step 642 to continue to check for such work to update the risk model to account for distressing work or other type of work performed on the railroad infrastructure.

At step 644, the control logic 600 can reduce fixed asset location scores. For example, the control logic 600 can determine that because work was performed within a distance satisfying the proximity threshold step 642, the relevant fixed asset location score should be reduced, because the risk of rail buckling has also been reduced because of the work. The control logic 600 can then terminate or repeat any of the aforementioned steps.

In one embodiment, steps 602-632 can correspond to the data foundation system 204. In another embodiment, steps 634-644 can correspond to, e.g., the fixed asset layer modeling system 208 of the asset association and modeling system 206.

Figure 7:
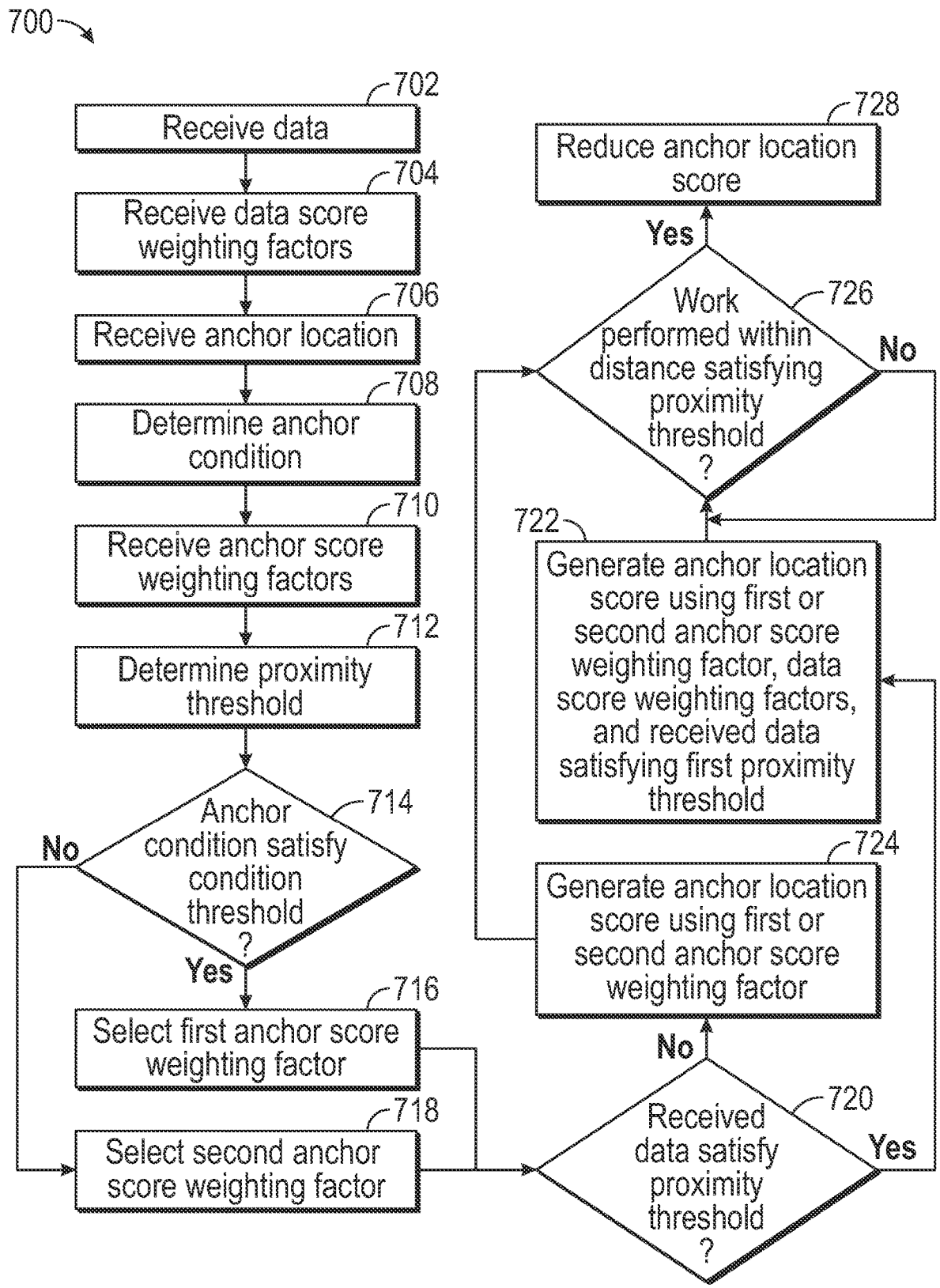
FIG. 7 illustrates a flowchart exemplifying an anchor risk modeling system, in accordance with one or more exemplary embodiments of the present disclosure.

FIG. 7 illustrates a flow chart diagram 700 exemplifying control logic embodying features of an anchor risk modeling system 700, in accordance with an exemplary embodiment of the present disclosure. The anchor risk modeling control logic 700 can be implemented as an algorithm on a server (e.g., server 102), a machine learning module, or other suitable system. Additionally, the anchor risk control logic 700 can implement or incorporate one or more features of the continuous welded rail risk assessment system 200, including the data foundation system 204, asset association and assessment system 206, fixed asset layer assessment system 208, tie cluster layer assessment system 210, anchor layer assessment system 212, and model aggregation system 202. The anchor risk modeling control logic 700 can be achieved with software, hardware, an application programming interface (API), a network connection, a network transfer protocol, HTML, DHTML, JavaScript, Dojo, Ruby, Rails, other suitable applications, or a suitable combination thereof.

The anchor risk modeling control logic 700 can leverage the ability of a computer platform to spawn multiple processes and threads by processing data simultaneously. The speed and efficiency of the anchor risk modeling control logic 700 is greatly improved by instantiating more than one process to facilitate personnel safety. However, one skilled in the art of programming will appreciate that use of a single processing thread may also be utilized and is within the scope of the present disclosure.

The anchor risk modeling control logic 700 process flow of the present embodiment begins at step 702, wherein the control logic 700 receives data. The data received at step 702 can include tie data, fixed asset data, anchor data, grade data, ballast data, joint data, rail equipment incident data, rail defects data, velocity data, maintenance data, rail removal data, curve data, distressing work data, or any other data suitable to facilitate the modeling of risk for rail buckling. In one embodiment, the data received in step 702 can be numerical data, qualitative data, or any other suitable form of data. In another embodiment, the received data can include location information indicating at which position relative to a railroad track the received data originated from and/or is associate with. For example, the data received at step 702 can include a specific position, such as coordinates or other position. In another embodiment, the data received at step 702 can be data related to a specific position. For example, the data can be regarding a section/segment of railroad track, and/or the environment therearound. The control logic 700 then proceeds to step 704.

At step 704, the control logic 700 can receive data score weighting factors. For example, the control logic 700 can be an operable communication with a database (such as database 104) that can store weighting factors that can be specific too particular data, such as data received in step 702. In one embodiment, the weighting factors can be similar to those discussed with respect to the weighting module 124. In another embodiment, the weighting factors can include multipliers, e.g. numbers that can be multiplied with data types that can vary by the data type with which they are to be multiplied. In another example, the weighting factors can include any other mechanisms or factors with which the control logic 700 can statistically weight data received, e.g. data received at step 702. The control logic 700 then proceeds to step 706.

At step 706, the control logic 700 can receive anchor locations. For example, the control logic 700 can receive data related to a plurality of anchor locations. In one embodiment, the control logic 700 can receive anchor locations with respect to a railroad track, e.g. the control logic 700 can receive locations of anchors installed in railroad infrastructure in the form of coordinates, milepost, or any other suitable location indication. The control logic 700 then proceeds to step 708.

At step 708, the control logic 700 can determine and anchor condition. For example, the control logic 700 can receive data related to the condition of an anchor. In one embodiment, the control logic 700 can be in operable communication with the database that can store information related to anchor location and/or anchor condition. For example, the control logic 700 can receive an indication of the condition of an anchor. In one embodiment, the control logic 700 can receive condition scores related to the anchor. For example, a percentage integrity can be indicated with respect to particular anchors. In one example, and anchor can be, e.g., at 50% integrity. In another example, an anchor condition can be indicated by color, determined by a scanner, determined by personnel, or elucidated in any other manner suitable to understand a condition of an anchor. In another embodiment, the control logic 700 can determine and anchor condition that can be defined qualitatively. For example, an anchor can have a poor condition, a fair condition, a good condition, and/or a new condition. In another embodiment, anchor conditions can be defined by colors, such as red anchors, yellow anchors, and green anchors, wherein red anchors can be of the worst condition, yellow can indicate medium condition, and green can indicate good condition. In another embodiment, anchor conditions can be defined and/or determined by the control logic 700 in any manner suitable to identify varying conditions of anchors and railroad infrastructure. The control logic then proceeds to step 710.

At step 710, the control logic 700 can receive anchor score weighting factors. For example, the control logic 700 can receive weighting factors associated with particular anchors. In one embodiment, the control logic 700 can receive weighting factors associated with anchors in a particular condition as determined in step 708. For example, the weighting factors receive at step 710 can be multipliers. In another embodiment, the weighting factors can be any other factors or other mechanisms that the control logic 700 can utilize to statistically weight anchor-related data and/or scores. The control logic 700 then proceeds to step 712.

At step 712, the control logic can determine proximity thresholds. For example, the control logic can determine proximity thresholds associated with the anchor locations received in step 706. In another embodiment, the control logic 700 can determine, for example, one or more tiers of proximity thresholds. In one example, a first tier of proximity thresholds determined at step 712 can be used by the control logic 700 to determine which data received at 702 should be associated with particular anchors whose locations were received at step 706. For example, the first tier of proximity thresholds, if satisfied by the locations of the received data at step 702, can indicate to the control logic 700 that such data points should be associated with particular anchor locations whose proximity thresholds are satisfied. In another embodiment, a second tier of proximity thresholds can include proximity thresholds around scored areas that can indicate to the control logic 700 whether particular scored areas should be consolidated. In another embodiment, the control logic 700 can implement any number of proximity thresholds suitable to enable the control logic 700 to associate received data with particular anchor locations and/or consolidate particular scored areas with one another via determination of proximity threshold satisfaction. The control logic 700 then proceeds to step 714.

At step 714, the control logic can determine whether the anchor condition satisfies a condition threshold. In one embodiment, the control logic 700 can implement a condition threshold. For example, an anchor condition (such an anchor condition determined at step 708) can be numerically represented, and if the anchor condition is of a particular magnitude, it can satisfy the condition threshold. In another embodiment, the condition threshold can enable the control logic 700 to distinguish between anchors that can be defined in ways other than numbers. For example, the control logic 700 can implement a condition threshold that can distinguish between red anchors and yellow anchors. For example, if an anchor is not in a red condition, the control logic 700 can determine that the condition threshold is not satisfied. In another example, if an anchor is in a red condition, the control logic 700 can determine that the condition threshold is satisfied. In another embodiment, the condition threshold can be any threshold that can enable the control logic 700 to distinguish between conditions of anchors however so defined. If the control logic 700 determines that the anchor condition satisfies the condition threshold, the control logic 700 then proceeds to step 716. If the control logic 700 determines that the anchor condition does not satisfy the condition threshold, the control logic 700 then proceeds to step 718.

At step 718, the control logic can select the first anchor score weighting factor. In one embodiment, the control logic 700 can examine the anchor score weighting factors received at step 710. In another embodiment, the control logic 700 can determine which anchor score weighting factor corresponds to an anchor of the anchor condition determined in step 708. For example, the control logic can select a red anchor score weighting factor, such as if the anchor condition is red. In another embodiment, the control logic 700 can select any anchor score weighting factor that can correspond to any anchor condition satisfying the condition threshold. The control logic then proceeds to step 720.

At step 718, the control logic 700 can select a second anchor score weighting factor. In one embodiment, the control logic 700 can examine the anchor score weighting factors received at step 710 and determine which anchor score weighting factor corresponds to anchors of a condition not satisfying the condition threshold. For example, the control logic can select a yellow anchor score weighting factor, such as if the anchor condition is yellow. In another embodiment, the control logic 700 can select any anchor score weighting factor that can correspond to an anchor condition not satisfying the condition threshold. The control logic then proceeds to step 720.

At step 720, the control logic 700 can determine whether the data received satisfies the proximity threshold. For example, the control logic 700 can determine whether the data received in any of step 702 satisfied the proximity threshold determined at step 712. In one example, the control logic 700 can determine whether any of the data points received in any of the previous steps fall within a geofence generated around the anchor locations. In one embodiment, data points that fall within the geofence can be considered to satisfy the proximity threshold. In another embodiment, the data points that do not fall within the geofence can be considered to not satisfy the proximity threshold. If the control logic 700 determines that received data satisfies the proximity threshold, the control logic 700 then proceeds to step 722. If the control logic 700 determines that received data does not satisfy the proximity threshold, the control logic 700 then proceeds to step 724.

At step 724, the control logic 700 can generate anchor location scores using the anchor score weighting factor. For example, if no received data satisfies the proximity threshold, the control logic 700 can generate the anchor location score using only the anchor score weighting factor. In one embodiment, the anchor location score can be equal to the weighting factor. For example, the presence of anchors can be indicated by tickers, set versus not-set indications, the number one, or any other representation indicating that an anchor is present. In another embodiment, if received data does not fall within the proximity threshold established around the anchor location, the control logic 700 can determine that the anchor location score should be equal to anchor score weighting factor and be unchanged by other data because such data does not satisfy the proximity threshold. The control logic 700 then proceeds to step 726.

At step 722, the control logic 700 can generate anchor location scores using anchor score weighting factors, received data satisfying the proximity threshold, and data score weighting factors. In one embodiment, the control logic 700 can utilize the determination made in step 720 to identify the received data that falls within the proximity thresholds of particular anchor locations and subsequently use such received data to calculate an anchor location score. In another example, the control logic 700 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 700 can determine that such incident equals one. If a second incident happens later down in the segment, the control logic 700 can determine that the second incident is also equal to one. In another embodiment, the control logic 700 can then determine whether one or both of the rail incidents occurred within a proximity threshold associated with a particular anchor location. If each of the incidents occurred within such proximity threshold, the control logic 700 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 700 can implement a similar strategy for each of the types of data received in any of the previous process flow steps. In this manner, the control logic 700 can generate anchor location scores. In another embodiment, the anchor location scores generated in step 724 can indicate that no other risk factors are present near an anchor location having such anchor location scores. In another embodiment, the anchor location scores generated in step 722 can indicate that one or more additional risk factors are within a proximity threshold of an anchor location, meaning that such risk factors increase an anchor location score because of such proximity. The control logic 700 then proceeds to step 726.

At step 726, the control logic 700 can determine whether work was performed within a distance satisfying the first proximity threshold. In one embodiment, the control logic 700 can determine whether destressing work was performed within the first proximity threshold. For example, the control logic 700 can receive an indication that such work was performed within the first proximity threshold. In another embodiment, the control logic 700 can receive indications of work locations and subsequently compare such locations to the anchor locations and associated proximity thresholds to determine which work locations (if any) satisfy which proximity thresholds associated with particular anchor locations. If the control logic 700 determines that work was performed within a distance of satisfying the proximity threshold of a particular anchor location, the control logic 700 then proceeds to step 728. If the control logic 700 determines that no work was performed within a distance satisfying the proximity threshold of a particular anchor location, the control logic 700 then proceeds to step 726 to continue to check for such work to update the risk model to account for distressing work or other type of work performed on the railroad infrastructure.

At step 728, the control logic 700 can reduce anchor location scores. For example, the control logic 700 can determine that because work was performed within a distance satisfying the proximity threshold step 726, the relevant anchor location score should be reduced, because the risk of rail buckling has also been reduced because of the work. The control logic 700 can then terminate or repeat any of the aforementioned steps.

Figure 8:
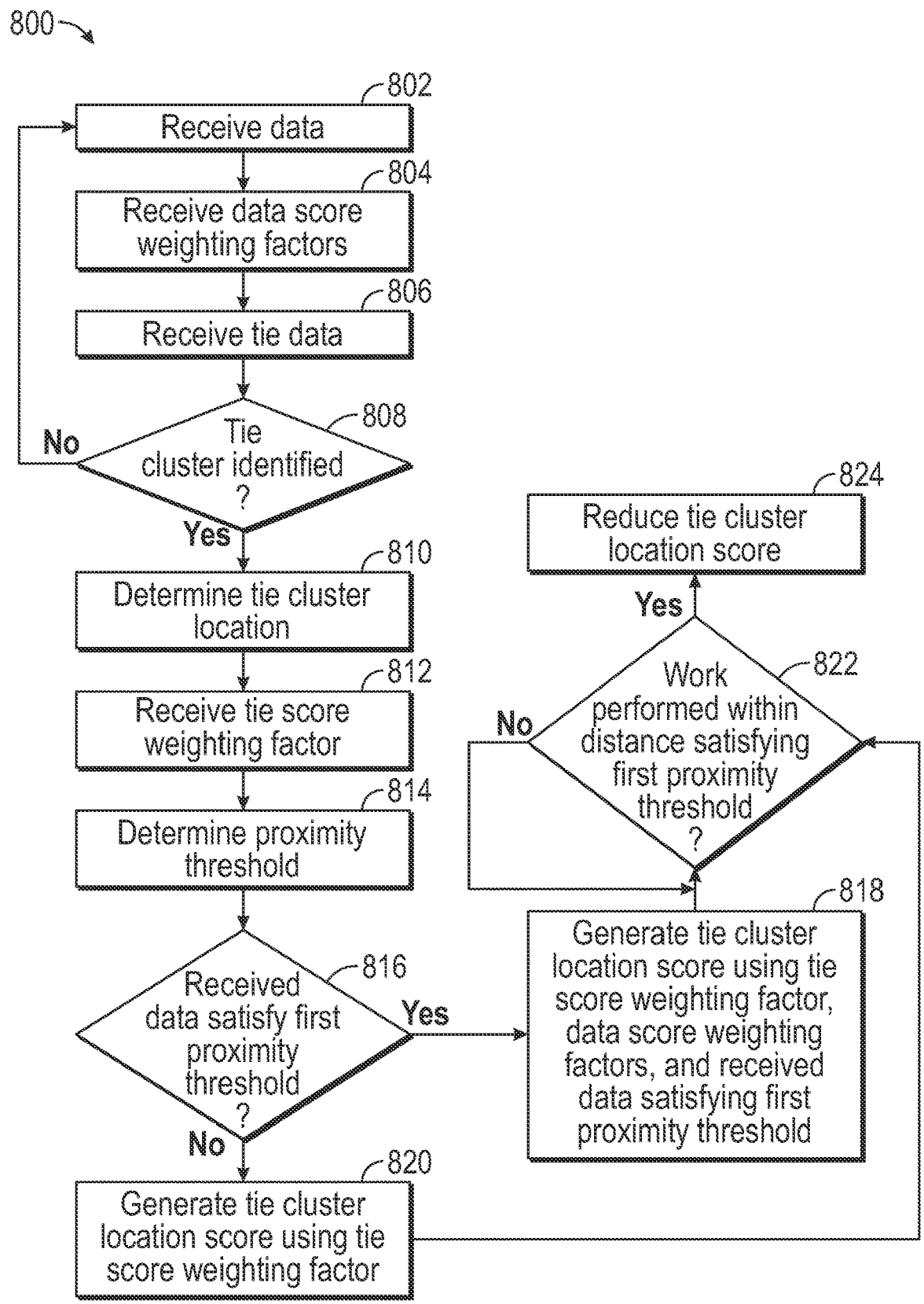
FIG. 8 illustrates a flowchart exemplifying a tie cluster risk modeling system, in accordance with one or more exemplary embodiments of the present disclosure.

FIG. 8 illustrates a flow chart diagram 800 exemplifying control logic embodying features of a tie cluster risk modeling system 800, in accordance with an exemplary embodiment of the present disclosure. The tie cluster risk modeling control logic 800 can be implemented as an algorithm on a server (e.g., server 102), a machine learning module, or other suitable system. Additionally, the tie cluster risk modeling control logic 800 can implement or incorporate one or more features of the continuous welded rail risk modeling system 200, including the data foundation system 204, asset association and modeling system 206, fixed asset layer modeling system 208, tie cluster layer modeling system 210, anchor layer modeling system 212, and model aggregation system 202. The tie cluster risk modeling control logic 800 can be achieved with software, hardware, an application programming interface (API), a network connection, a network transfer protocol, HTML, DHTML, JavaScript, Dojo, Ruby, Rails, other suitable applications, or a suitable combination thereof.

The tie cluster risk modeling control logic 800 can leverage the ability of a computer platform to spawn multiple processes and threads by processing data simultaneously. The speed and efficiency of the tie cluster risk modeling control logic 800 is greatly improved by instantiating more than one process to facilitate personnel safety. However, one skilled in the art of programming will appreciate that use of a single processing thread may also be utilized and is within the scope of the present disclosure.

The anchor risk modeling control logic 800 process flow of the present embodiment begins at step 802, wherein the control logic 800 receives data. The data received at step 802 can include tie data, fixed asset data, anchor data, grade data, ballast data, joint data, rail equipment incident data, rail defects data, velocity data, maintenance data, rail removal data, curve data, distressing work data, or any other data suitable to facilitate the modeling of risk for rail buckling. In one embodiment, the data received in step 802 can be numerical data, qualitative data, or any other suitable form of data. In another embodiment, the received data can include location information indicating at which position relative to a railroad track the received data originated from and/or is associate with. For example, the data received at step 802 can include a specific position, such as coordinates or other position. In another embodiment, the data received at step 802 can be data related to a specific position. For example, the data can be regarding a section/segment of railroad track, and/or the environment therearound. The control logic 800 then proceeds to step 804.

At step 804, the control logic 800 can receive data score weighting factors. For example, the control logic 800 can be an operable communication with a database (such as database 104) that can store weighting factors that can be specific too particular data, such as data received in step 802. In one embodiment, the weighting factors can be similar to those discussed with respect to the weighting module 124. In another embodiment, the weighting factors can include multipliers, e.g. numbers that can be multiplied with data types that can vary by the data type with which they are to be multiplied. In another example, the weighting factors can include any other mechanisms or factors with which the control logic 800 can statistically weight data received, e.g. data received at step 802. The control logic 800 then proceeds to step 806.

At step 806, the control logic 800 can receive tie data. For example, the control logic 800 can include tie locations, tie conditions, tie compositions, or any other data related to ties in a railroad infrastructure. In another embodiment, the control logic 800 can receive data related to positions of ties relative to one another. The control logic 800 then proceeds to step 808.

At step 808, the control logic 800 can determine whether one or more tie clusters have been identified. For example, the control logic 800 can examine that tie data received at step 806 and compare locations of ties and conditions of ties to search for tie clusters. In one embodiment, a tie cluster can refer to a particular number of ties in a row each of a condition satisfying a particular type condition threshold. For example, each tie can be assigned a tie condition score, which can be similar to the anchor condition score in accordance with the principles of the present disclosure. In another embodiment, each of the ties can be qualitatively define with respect to their condition. For example, each tie can be in a poor condition, fair condition, or good condition. In another embodiment, each tie can be color coded and/or have a condition as defined by a color. For example, each tie can be in a red condition, a yellow condition, a green condition, or black condition. In another embodiment, the tie condition can correspond to conditions such as can be seen in U.S. patent application Ser. No. 17/124,824, entitled "SYSTEM AND METHOD FOR RAILROAD TIE MANAGEMENT," which is herein incorporated by reference in its entirety.

In another embodiment, the control logic 800 can examine tie data such as tie condition data and tie location data and identify tie clusters. For example, the control logic 800 can implement condition thresholds as discussed above, as well as proximity thresholds with respect to each tie to determine which ties are adjacent to one another. In one example, tie clusters can be bad tie clusters. for example, a tie cluster can include a particular number of ties, each adjacent to the next, each satisfying a particular type condition threshold. In another example, a tie cluster can include a particular number of ties in a row each satisfying a particular tie condition threshold indicating that the ties need to be replaced. In another embodiment, a tie cluster can be any collection of ties satisfying any number of proximity and/or condition thresholds that can be included in a risk model for predicting rail buckling risk in a continuous welded rail track. In one embodiment, a tie cluster can include at least five ties in a row that each need to be replaced. If the control logic 800 does not identify a tie cluster, the control logic proceeds back to step 802. If the control logic 800 identifies a tie cluster, the control logic then proceeds to step 810.

At step 810, the control logic 800 can determine a tie cluster location. For example, the control logic 800 can utilize location data associated with each tie to identify a location of that tie cluster with respect to a railroad track. In another example, the control logic 800 can assign a center point to the cluster and associate a particular set of coordinates with the center point, and the center point can serve as a tie cluster location. In another embodiment, the control logic 800 can utilize any other suitable mechanism to determine a tie cluster location. The control logic then proceeds to step 812.

At step 812, the control logic 800 can receive a tie score weighting factor. For example, the control logic 800 can be in operable communication with the database storing a plurality of weighting factors. In one embodiment, the control logic 800 can associate a tie score weighting factor with a tie cluster. For example, the control logic 800 can select the tie score weighting factor from the plurality of weighting factors. In another example, the tie score weighting factor can vary with the size of the tie cluster. For example, if a tie cluster includes a higher number of ties, the tie score weighting factor can be larger or smaller as needed to correctly weight the tie cluster score with respect to a risk model. In another embodiment, if a tie cluster includes a lower number of ties, the weighting factor can be larger or smaller to appropriately weight the score of that tie cluster location with respect to a risk model. In another embodiment, the tie score weighting factor can be a constant number that can be applied ubiquitously to all tie clusters regardless of the number of ties accounted for therein. The control logic 800 then proceeds to step 814.

At step 814, the control logic can determine proximity thresholds. For example, the control logic can determine proximity thresholds associated with the tie cluster locations identified in step 808. In another embodiment, the control logic 800 can determine, for example, one or more tiers of proximity thresholds. In one example, a first tier of proximity thresholds determined at step 814 can be used by the control logic 800 to determine which data received at 802 should be associated with particular tie clusters whose locations were identified at step 810. For example, the first tier of proximity thresholds, if satisfied by the locations of the received data at step 802, can indicate to the control logic 800 that such data points should be associated with particular tie cluster locations whose proximity thresholds are satisfied. In another embodiment, a second tier of proximity thresholds can include proximity thresholds around scored areas that can indicate to the control logic 800 whether particular scored areas should be consolidated. In another embodiment, the control logic 800 can implement any number of proximity thresholds suitable to enable the control logic 800 to associate received data with particular tie cluster locations and/or consolidate particular scored areas with one another via determination of proximity threshold satisfaction. The control logic 800 then proceeds to step 816.

At step 816, the control logic 800 can determine whether received data satisfies one or more proximity thresholds. For example, the control logic can determine whether the data received at step 802 satisfies the one or more proximity thresholds determined at step 814. In one embodiment, the control logic 800 can utilize a first tier of proximity thresholds to determine whether data received at step 802 should be associated with particular tie cluster locations determined at step 810. If the control logic 800 determines that the received data does not satisfy the proximity threshold, the control logic 800 then proceeds to step 820. If the control logic 800 determines that the received data satisfies the proximity threshold, the control logic 800 then proceeds to step 818.

At step 820, the control logic 800 can generate tie cluster location scores using the tie cluster score weighting factor. For example, if no received data satisfies the proximity threshold, the control logic 800 can generate the tie cluster location score using only the tie cluster score weighting factor. In one embodiment, the tie cluster location score can be equal to the weighting factor. For example, the presence of tie clusters can be indicated by tickers, set versus not-set indications, the number one, or any other representation indicating that a tie cluster is present. In another embodiment, if received data does not fall within the proximity threshold established around the tie cluster location, the control logic 800 can determine that the tie cluster location score should be equal to tie cluster score weighting factor and be unchanged by other data because such data does not satisfy the proximity threshold. The control logic 800 then proceeds to step 822.

At step 818, the control logic 800 can generate tie cluster location scores using tie cluster score weighting factors, received data satisfying the proximity threshold, and data score weighting factors. In one embodiment, the control logic 800 can utilize the determination made in step 816 to identify the received data that falls within the proximity thresholds of particular tie cluster locations and subsequently use such received data to calculate a tie cluster location score. In another example, the control logic 800 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 800 can determine that such incident equals one. If a second incident happens later down in the segment, the control logic 800 can determine that the second incident is also equal to one. In another embodiment, the control logic 800 can then determine whether one or both of the rail incidents occurred within a proximity threshold associated with a particular tie cluster location. If each of the incidents occurred within such proximity threshold, the control logic 800 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 800 can implement a similar strategy for each of the types of data received in any of the previous process flow steps. In this manner, the control logic 800 can generate tie cluster location scores. In another embodiment, the tie cluster location scores generated in step 820 can indicate that no other risk factors are present near a tie cluster location having such tie cluster location scores. In another embodiment, the tie cluster location scores generated in step 818 can indicate that one or more additional risk factors are within a proximity threshold of a tie cluster location, meaning that such risk factors increase a tie cluster location score because of such proximity. The control logic 800 then proceeds to step 822.

At step 822, the control logic 800 can determine whether work was performed within a distance satisfying the first proximity threshold. In one embodiment, the control logic 800 can determine whether destressing work was performed within the first proximity threshold. For example, the control logic 800 can receive an indication that such work was performed within the first proximity threshold. In another embodiment, the control logic 800 can receive indications of work locations and subsequently compare such locations to the tie cluster locations and associated proximity thresholds to determine which work locations (if any) satisfy which proximity thresholds associated with particular tie cluster locations. If the control logic 800 determines that work was performed within a distance of satisfying the proximity threshold of a particular tie cluster location, the control logic 800 then proceeds to step 824. If the control logic 800 determines that no work was performed within a distance satisfying the proximity threshold of a particular tie cluster location, the control logic 800 then proceeds to step 822 to continue to check for such work to update the risk model to account for distressing work or other type of work performed on the railroad infrastructure.

At step 824, the control logic 800 can reduce tie cluster location scores. For example, the control logic 800 can determine that because work was performed within a distance satisfying the proximity threshold step 822, the relevant tie cluster location score should be reduced, because the risk of rail buckling has also been reduced because of the work. The control logic 800 can then terminate or repeat any of the aforementioned steps.

Figure 9:
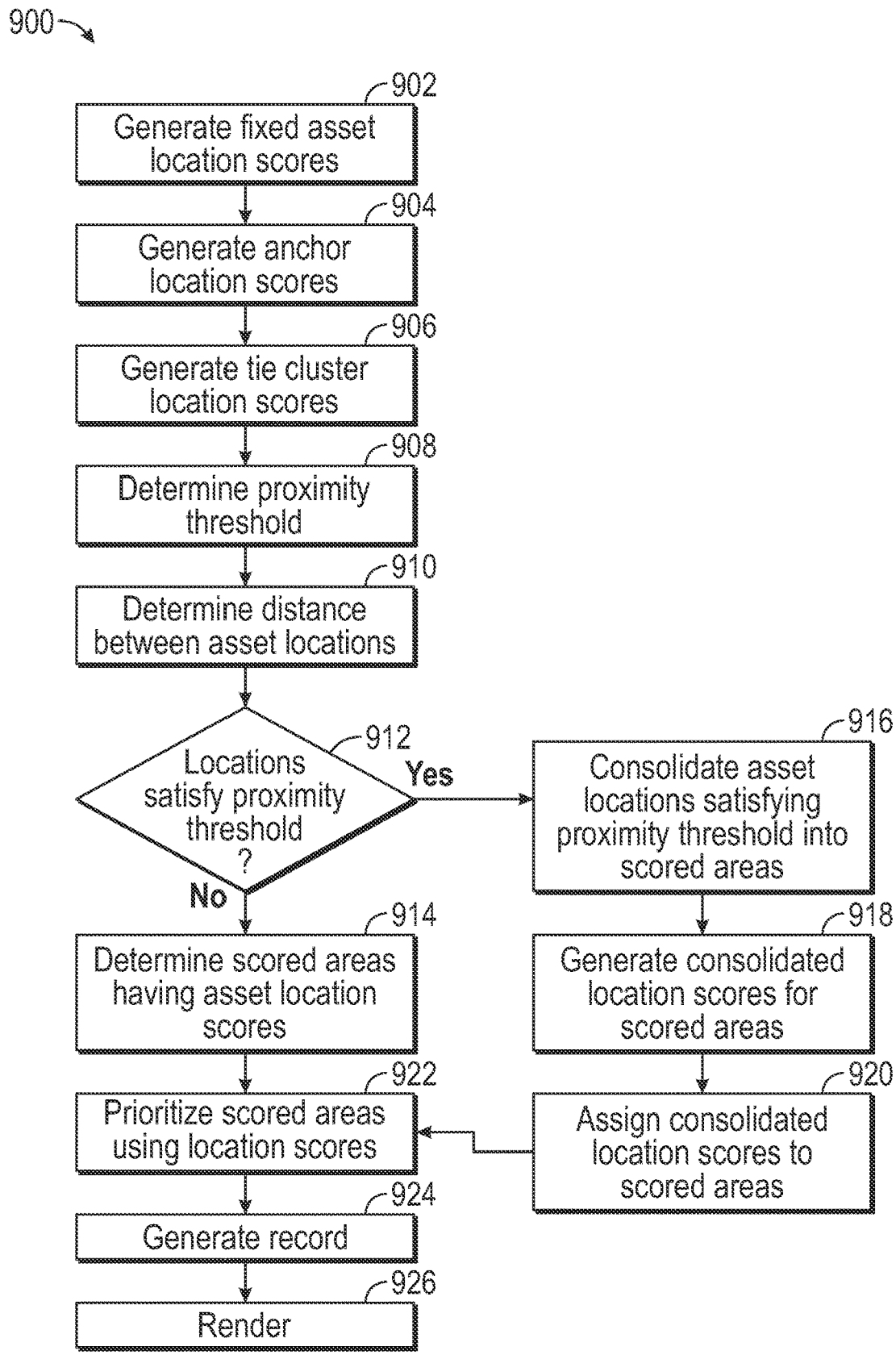
FIG. 9 illustrates a flowchart exemplifying a continuous welded rail risk modeling system, in accordance with one or more exemplary embodiments of the present disclosure.

FIG. 9 illustrates a flow chart diagram 900 exemplifying control logic embodying features of a continuous welded rail risk modeling system 900, in accordance with an exemplary embodiment of the present disclosure. The continuous welded rail risk modeling control logic 900 can be implemented as an algorithm on a server (e.g., server 102), a machine learning module, or other suitable system. Additionally, the continuous welded rail risk modeling control logic 900 can implement or incorporate one or more features of the continuous welded rail risk assessment system 200, including the data foundation system 204, asset association and assessment system 206, fixed asset layer assessment system 208, tie cluster layer assessment system 210, anchor layer assessment system 212, and model aggregation system 202. The continuous welded rail risk modeling control logic 900 can be achieved with software, hardware, an application programming interface (API), a network connection, a network transfer protocol, HTML, DHTML, JavaScript, Dojo, Ruby, Rails, other suitable applications, or a suitable combination thereof.

The continuous welded rail risk modeling control logic 900 can leverage the ability of a computer platform to spawn multiple processes and threads by processing data simultaneously. The speed and efficiency of the continuous welded rail risk modeling control logic 900 is greatly improved by instantiating more than one process to facilitate personnel safety. However, one skilled in the art of programming will appreciate that use of a single processing thread may also be utilized and is within the scope of the present disclosure.

The continuous welded rail risk modeling control logic 900 process flow of the present embodiment begins at step 902, wherein the control logic 900 generates fixed asset location scores. In one embodiment, the control logic 900 can generate fixed asset location scores using the fixed asset score weighting factor in accordance with the principles of the present disclosure. For example, if no received data satisfies the proximity threshold, the control logic 900 can generate the fixed asset location score using only the fixed asset score weighting factor. In one embodiment, the fixed asset location score can be equal to the weighting factor. For example, the presence of fixed assets can be indicated by tickers, set versus not-set indications, the number one, or any other representation indicating that a fixed asset is present. In another embodiment, if received data does not fall within the proximity threshold established around the fixed asset location, the control logic 900 can determine that the fixed asset location score should be equal to fixed asset score weighting factor and be unchanged by other data because such data does not satisfy the proximity threshold.

In another embodiment, the control logic 900 can generate fixed asset location scores using fixed asset score weighting factors, received data satisfying the proximity threshold, and data score weighting factors in accordance with the principles of the present disclosure. In one embodiment, the control logic 900 can identify received data that falls within the proximity thresholds of particular fixed asset locations and subsequently use such received data to calculate a fixed asset location score. In another example, the control logic 900 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 900 can determine that such incident equals one. If a second incident happens later down in the segment, the control logic 900 can determine that the second incident is also equal to one. In another embodiment, the control logic 900 can then determine whether one or both of the rail incidents occurred within a proximity threshold associated with a particular fixed asset location. If each of the incidents occurred within such proximity threshold, the control logic 900 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 900 can implement a similar strategy for each of the types of data received in any of the previous process flow steps. In this manner, the control logic 900 can generate fixed asset location scores. In another embodiment, the fixed asset location scores generated in step 638 can indicate that no other risk factors are present near a fixed asset location having such fixed asset location scores. In another embodiment, the fixed asset location scores generated in step 640 can indicate that one or more additional risk factors are within a proximity threshold of a fixed asset location, meaning that such risk factors increase a fixed asset location score because of such proximity. The control logic 900 then proceeds to step 904.

At step 904, the control logic 900 can generate anchor location scores. For example, the control logic 900 can generate anchor location scores using an anchor score weighting factor. For example, if no received data satisfies the proximity threshold, the control logic 900 can generate the anchor location score using only the anchor score weighting factor. In one embodiment, the anchor location score can be equal to the weighting factor. For example, the presence of anchors can be indicated by tickers, set versus not-set indications, the number one, or any other representation indicating that an anchor is present. In another embodiment, if received data does not fall within the proximity threshold established around the anchor location, the control logic 900 can determine that the anchor location score should be equal to anchor score weighting factor and be unchanged by other data because such data does not satisfy the proximity threshold.

In another embodiment, the control logic 900 can generate anchor location scores using anchor score weighting factors, received data satisfying the proximity threshold, and data score weighting factors. In one embodiment, the control logic 900 can identify received data that falls within the proximity thresholds of particular anchor locations and subsequently use such received data to calculate an anchor location score. In another example, the control logic 900 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 900 can determine that such incident equals one. If a second incident happens later down in the segment, the control logic 900 can determine that the second incident is also equal to one. In another embodiment, the control logic 900 can then determine whether one or both of the rail incidents occurred within a proximity threshold associated with a particular anchor location. If each of the incidents occurred within such proximity threshold, the control logic 900 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 900 can implement a similar strategy for each of the types of data received in any of the previous process flow steps. In this manner, the control logic 900 can generate anchor location scores. In another embodiment, the anchor location scores generated can indicate that no other risk factors are present near an anchor location having such anchor location scores. In another embodiment, the anchor location scores can indicate that one or more additional risk factors are within a proximity threshold of an anchor location, meaning that such risk factors increase an anchor location score because of such proximity. The control logic 900 then proceeds to step 906.

At step 906, the control logic 900 can generate tie cluster location scores. In one embodiment, the control logic 900 can generate tie cluster location scores using the tie cluster score weighting factor. For example, if no received data satisfies the proximity threshold, the control logic 900 can generate the tie cluster location score using only the tie cluster score weighting factor. In one embodiment, the tie cluster location score can be equal to the weighting factor. For example, the presence of tie clusters can be indicated by tickers, set versus not-set indications, the number one, or any other representation indicating that a tie cluster is present. In another embodiment, if received data does not fall within the proximity threshold established around the tie cluster location, the control logic 900 can determine that the tie cluster location score should be equal to tie cluster score weighting factor and be unchanged by other data because such data does not satisfy the proximity threshold.

In another embodiment, the control logic 900 can generate tie cluster location scores using tie cluster score weighting factors, received data satisfying the proximity threshold, and data score weighting factors. In one embodiment, the control logic 900 can identify received data that falls within the proximity thresholds of particular tie cluster locations and subsequently use such received data to calculate a tie cluster location score. In another example, the control logic 900 can statistically weight the received data satisfying the proximity threshold with the data score weighting factor associated with the specific type of data. In another example, each of the received data points received in the previous process flow steps can be represented by tickers, set versus not-set, the number one, or any other indication of presence. For example, if a rail incident occurred in a particular segment of track, the control logic 900 can determine that such incident equals one. If a second incident happens later down in the segment, the control logic 900 can determine that the second incident is also equal to one. In another embodiment, the control logic 900 can then determine whether one or both of the rail incidents occurred within a proximity threshold associated with a particular tie cluster location. If each of the incidents occurred within such proximity threshold, the control logic 900 can determine that the total number of rail incidents equals "2". In another embodiment, this number of rail incidents can then be statistically weighted by the rail incident weighting factor, such as by multiplying the number of rail incidents by the rail incident weighting factor. In another embodiment, the control logic 900 can implement a similar strategy for each of the types of data received in any of the previous process flow steps. In this manner, the control logic 900 can generate tie cluster location scores. In another embodiment, the tie cluster location scores generated can indicate that no other risk factors are present near a tie cluster location having such tie cluster location scores. In another embodiment, the tie cluster location scores generated can indicate that one or more additional risk factors are within a proximity threshold of a tie cluster location, meaning that such risk factors increase a tie cluster location score because of such proximity. The control logic 900 then proceeds to step 908.

At step 908, the control logic can determine proximity thresholds. For example, the control logic can determine proximity thresholds associated with the asset locations, such as locations of assets such as fixed assets, anchors, and tie clusters. In another embodiment, proximity thresholds can include proximity thresholds around asset locations and/or scored areas associated with the asset locations that can indicate to the control logic 900 whether particular asset locations/scored areas should be consolidated. For example, an asset location with a score can be a scored area. In another embodiment, the control logic 900 can implement any number of proximity thresholds suitable to enable the control logic 900 to consolidate particular scored areas with one another via determination of proximity threshold satisfaction. The control logic 900 then proceeds to step 910.

At step 910, the control logic 900 can determine a distance between asset locations. For example, the control logic 900 can receive locations of assets and compare such locations to one another. In another example, the control logic 900 can determine a track distance between asset locations. In one embodiment, the control logic 900 can receive data related to track length, and can utilize such track length data with the asset locations to determine a track distance between asset locations. In another embodiment, the control logic 900 can receive coordinates of asset locations and calculate a distance between the coordinates. The control logic 900 then proceeds to step 912.

At step 912, the control logic 900 can determine whether a proximity threshold is satisfied. For example, the control logic 900 can determine whether the distance between any two or more given asset locations satisfies a proximity threshold. For example, the control logic 900 can implement and/or analyze the proximity threshold determined at step 908 after generating asset location scores, such as at steps 902, 904, 906. In another embodiment, the proximity threshold examined by the control logic 900 at step 912 can refer to a magnitude of distance between any given asset locations. In one embodiment, if a distance between any two given asset locations is less than or equal to the magnitude of the proximity threshold, the control logic 900 can determine that the proximity threshold is satisfied. If the control logic 900 determines that the proximity threshold is not satisfied, the control logic 900 then proceeds to step 914. If the control logic 900 determines that the proximity threshold is satisfied, the control logic 900 then proceeds to step 916.

At step 914, the control logic 900 can determine scored areas having asset location scores. In one embodiment, the control logic 900 can consider one or more of the identified asset locations, each with an asset location score, and if the asset location has not been consolidated with another asset location previously in the process flow, the control logic 900 can determine that the asset location can be a scored area having the asset location score. The control logic 900 then proceeds to step 922.

At step 916, the control logic 900 can consolidate asset locations satisfying a proximity threshold into scored areas. For example, the control logic 900 can determine that asset locations within a certain proximity of one another (such as within a proximity that satisfies the proximity threshold) should be consolidated into scored areas. For example, the control logic 900 can determine that two or more asset locations satisfying the proximity threshold can be consolidated into a single scored area. In one embodiment, the control logic 900 can determine that such asset location satisfying the proximity threshold should be considered as singular larger areas for the purposes of the risk model to be generated. The control logic 900 then proceeds to step 918.

At step 918, the control logic 900 can generate consolidated location scores. For example, the control logic can implement the asset location scores generated at steps 902, 904, 906 and consolidate such scores together for such asset locations satisfying the proximity threshold. In another example, the control logic 900 can aggregate the asset location scores if the asset locations satisfy the proximity threshold with respect to one another. In another embodiment, the control logic 900 can generate consolidated location scores reflecting a larger scored area corresponding to two or more asset locations satisfying the proximity threshold. The control logic then proceeds to step 920.

At step 920, the control logic 900 can assign the consolidated location scores to the consolidated scored areas. In one embodiment, the control logic 900 can assign the consolidated location scores generated in step 918 to the scored areas determined at step 916. For example, the control logic 900 can determine that the asset locations consolidated into the scored areas at step 916 each had a corresponding asset location score prior to the consolidation. In another example, the control logic 900 can generate the consolidated location scores using these asset location scores at step 918, and by associating the consolidated scored area with the specific asset locations serving as constituents to the consolidated scored area, the control logic 900 can determine that a given consolidated location score should be assigned to a given consolidated scored area. The control logic 900 then proceeds to step 922.

At step 922, the control logic 900 can prioritize scored areas using the location scores. For example, the control logic 900 can compare the asset location scores and the consolidated location scores to determine priority. In one embodiment, each of the scored areas determined in steps 914 and 920 can include a location score (e.g., an asset location score and/or a consolidated location score). In another embodiment, the control logic 900 can compare location scores corresponding to the scored areas to determine priority. In one example, a scored area having a higher location score can be deemed by the control logic 900 to have a higher priority. For example, a higher location score can indicate a higher level of risk of rail buckling for a particular scored area. In another embodiment, the control logic 900 can perform any other suitable comparison to utilize the data and/or location scores to prioritize scored areas relative to one another. In one embodiment, the control logic 900 can implement one or more score thresholds to facilitate prioritization of the scored areas. For example, the control logic 900 can implement a first score threshold, such that if a location score associated with a particular scored area is of a certain magnitude, the scored area can be assigned a certain priority level. In another embodiment, the control logic can implement a second score threshold, such that if a location score associated with a particular scored area is of a certain magnitude (e.g. lower than the first scored threshold but higher than the second score threshold), the scored area can be assigned a different priority level.

In another embodiment, the control logic 900 can prioritize scored areas based on sizes of the scored areas. For example, the control logic 900 can determine a size of a particular scored area, such as by considering an asset location along with a proximity threshold (such as the proximity threshold considered in step 314). In another embodiment, the control logic 900 can consider sizes of two or more asset locations consolidated into a consolidated scored area and use such sizes to determine a size of the consolidated scored area. In another embodiment, the control logic 900 can receive an asset location and such location can include a scored area size. In another embodiment, a scored area size can be defined by asset locations, proximity thresholds, and/or consolidations thereof. In one example, the control logic 900 can implement one or more size thresholds to assist and/or facilitate the prioritization of scored areas as related to other scored areas. In one embodiment, a size threshold can include a certain magnitude, such as can be measured in feet, meters, miles, or any other unit of distance, such as a unit of distance squared. For example, a scored area having a particular area magnitude can be compared with a size threshold, and if the scored area has a particular area magnitude, the scored area can satisfy the size threshold.

In another embodiment, the control logic 900 can prioritize scored areas based on scored area size and/or location score associated with the scored area. For example, scored areas can be prioritized by location score, and then further prioritized by scored area size. In one embodiment, a collection of scored areas having location scores within a particular range (and/or satisfying one or more particular score thresholds) can be prioritized under a first priority assignment. In another example, such scored areas having the first priority assignment can be further prioritized by size of the scored area. For example, scored areas satisfying a particular score threshold and falling within a particular size range (and/or satisfying one or more particular size thresholds) can be prioritized within the first priority assignment, such that a collection of scored areas having particular location scores can be further prioritized. The control logic 900 then proceeds to step 924.

At step 924, the control logic 900 can generate a record. For example, the control logic 900 can store the data generated during the process flow 900 in a tabulated format. In one embodiment, the record can include fields organized by specific asset location, location score, scored area, whether the scored area is a consolidated scored area, the asset location scores utilized in arriving at a given location/consolidated location score, and/or any other field related to the data utilized, transformed, and/or generated during the process flow 900. The control logic 900 then proceeds to step 926.

At step 926, the control logic 900 can render. For example, the control logic 900 can render a risk model indicating prioritization of scored areas resulting from step 922. In another embodiment, the control logic 900 can render the record generated at step 924. For example, the control logic 900 can generate a tabulated rendering of data received and/or generated during the process flow and sort the data according to location scores. In one embodiment, the control logic 900 can indicate that scored areas having higher location scores can require a higher priority than scored areas having lower location scores. For example, the scored areas having higher location scores can be highlighted, colored, bolded, or emphasized in any other manner suitable to indicate that such areas having higher location scores require a higher priority. In another embodiment, the control logic 900 can render the risk model in an interactive track chart. For example, the control logic can indicate, on a track chart, asset locations, asset types, proximity thresholds, asset location scores, consolidated location scores, scored areas, and/or priority of each scored area. In one embodiment, the control logic 900 can indicate on an interactive track chart which scored areas fall within a particular range priority. For example, the control logic 900 can include one or more priority threshold associated with the location scores the scored area, and subsequently prioritize groups of scored areas based on location score. In one embodiment, the control logic 900 can indicate which scored areas meet such priority criteria, such as by rendering an interactive track chart with such scored areas emphasized, e.g. via color coding, bolding, or any other suitable mechanism of emphasis. In another embodiment, the control logic 900 can further indicate via rendering the size of the scored areas. For example, with respect to an interactive track chart, the control logic 900 can implement shapes differing in size superimposed on the interactive track chart as an indication of a size of a scored area. In another embodiment, such shapes can further be color coded to indicate which score threshold is satisfied by the scored area as a further indication of risk. The control logic 900 can then terminate or repeat any of the aforementioned steps.

Figure 10A:
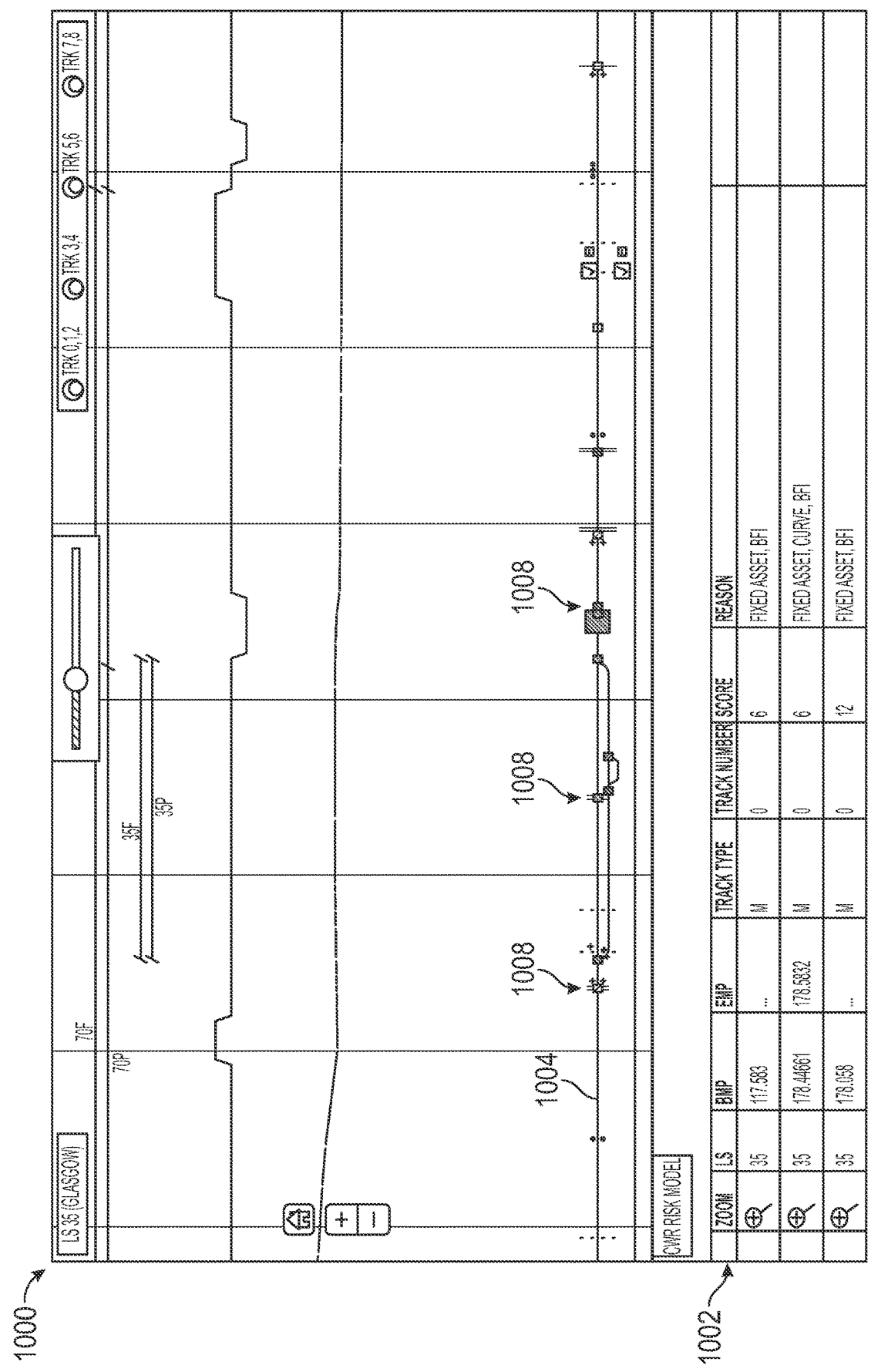
FIG. 10A depicts an exemplary rendering of a risk model in accordance with one or more exemplary embodiments of the present disclosure.
Figure 10B:
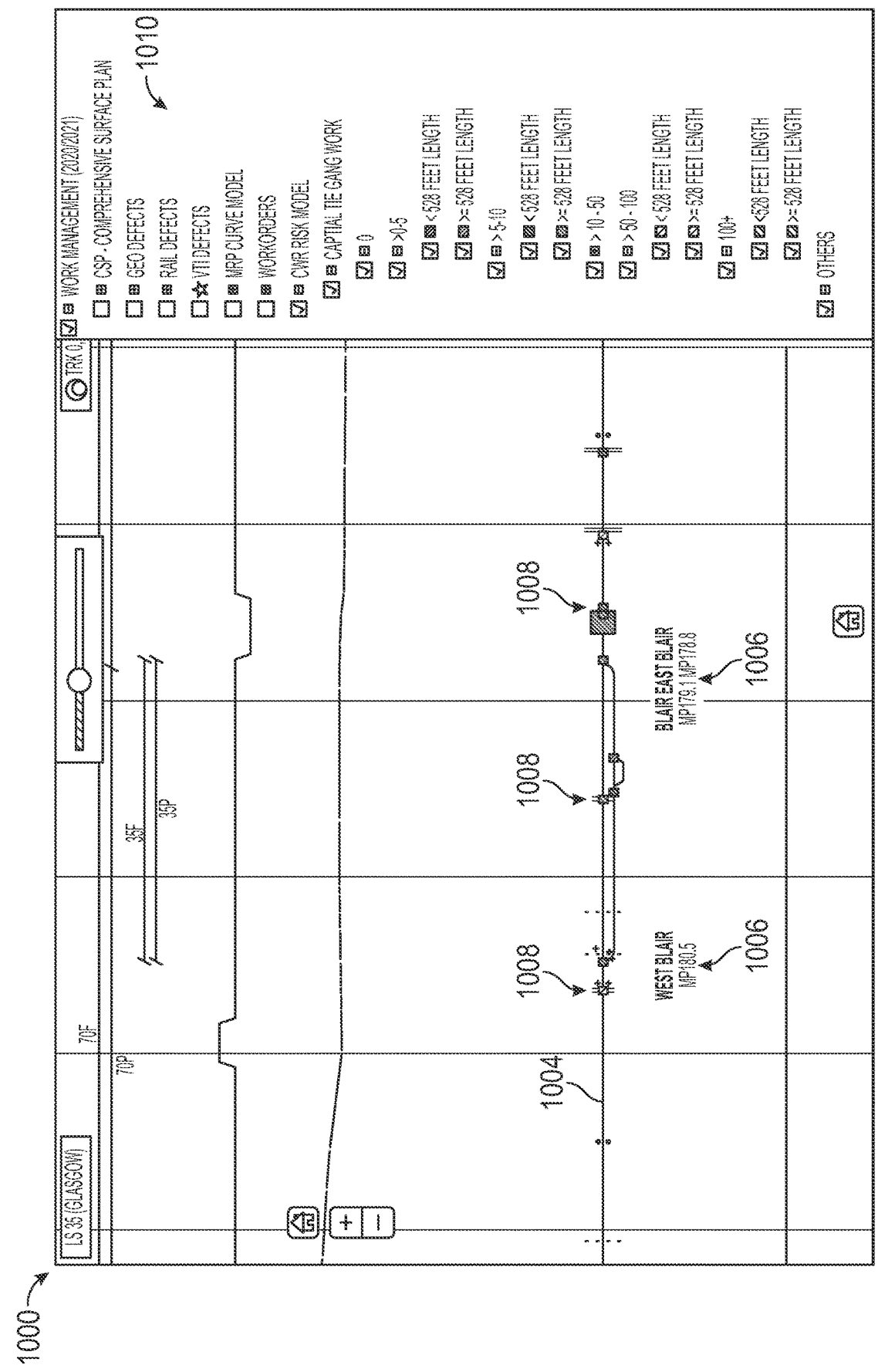
FIG. 10B depicts an exemplary rendering of a risk model in accordance with one or more exemplary embodiments of the present disclosure.

FIGS. 10A-10B depict exemplary renderings of risk models in accordance with the principles of the present disclosure. Interactive track charts 1000 can include a track 1004 and divisions 1006 of the track. In another embodiment, the rendering 1000 can include scored areas 1008 that can be emphasized and/or prioritized in accordance with the principles of the present disclosure. For example, the scored areas 1008 can be prioritized according to a key 1010, such that the priority of each scored area can be determined by a user and/or railroad system. In another embodiment, the rendering 1000 can include a table 1002 that can indicate further information about a given scored area. For example, the table 1002 can include a number of fields, such as the beginning mile point, end mile point, track type, track number, the score of the given scored area, and the reason for the assigned score. In another example, the rendering 1000 and/or table 1002 can provide the data included in the generated/assigned score. For example, the rendering 1000 can indicate that a particular area has a particular score due to the presence of a fixed asset, a particular ballast fouling index satisfying an index threshold hold, and/or a particular curve satisfying a curve threshold. In another embodiment, the scored areas 1008 can be prioritized by score, and/or by size. For example, the key 1010 depicts that scored areas can be prioritized first by score (e.g. 0-5, 5-10, 10-50, etc.) and further prioritized by size (e.g. <528 feet length, >=528 feet length, etc.).

The present disclosure achieves at least the following advantages:

1. Transforming received data using specialized algorithms to forecast risk of rail buckling;

2. Multilayer modeling of risk of rail buckling;

3. Prioritizing track maintenance based on calculated risk of rail buckling;

4. Enhanced rail buckling risk management and mitigation;

5. Providing a system and method to utilize mass data collection for risk modeling in a railroad infrastructure;

6. Isolating prominent risk factors for rail buckling and statistically weighting their significance with respect to one another; and 7. Providing a scoring system that utilizes proximity thresholds and/or geofences to determine risk significance for each particular data type.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for modeling risk of rail buckling in continuous welded rail, the system comprising:
   one or more sensors configured to collect at least a portion of a plurality of data points related to a section of a railroad track, the plurality of data points being relevant to a risk of rail buckling on the section of the railroad track;
   a memory having a first database storing the plurality of data points, thresholds, and specifications related to railroad tracks and assets; and
   a computer processor operably coupled to the memory and capable of executing machine-readable instructions to perform program steps, the program steps including:
      receiving at least one data point of the plurality of data points related to a section of the railroad track from a data foundation system;
      displaying the at least one of the plurality of data points on a track map, each of the displayed data points having a different identifier;
      receiving at least one data score weighting factor associated with the at least one data point of the plurality of data points;
      determining a first asset location;
      determining a first asset type;
      receiving a first asset score weighting factor;
      generating, via the processor, a first asset location score using the first asset score weighting factor, the at least one data point, and the at least one data score weighting factor, if the at least one data point satisfies a first proximity threshold relative to the first asset location;
      generating, via the processor, the first asset location score using the first asset score weighting factor, if the at least one data point does not satisfy the first proximity threshold; and
      determining a scored area having a scored area size and corresponding to at least the first asset location,
      wherein the first asset score weighting factor varies with the first asset type.

2. The system of claim 1, wherein the program steps further include:
   determining a second asset location;
   generating a second asset location score; and
   determining a distance between the first asset location and the second asset location.

3. The system of claim 2, wherein the program steps further include:
   if the distance between the first and second asset locations satisfies a second proximity threshold:
      including the first asset location and the second asset location in the scored area;
      generating, via the processor, a consolidated location score including the first asset location score and the second asset location score; and
      assigning the consolidated location score to the scored area.

4. The system of claim 2, wherein the program steps further include:
   determining a second asset type;
   receiving a second asset score weighting factor;
   generating, via the processor, the second asset location score using the second asset score weighting factor, the at least one data point, and the at least one data score weighting factor if the at least one data point satisfies a third proximity threshold relative to the second asset location;
   generating, via the processor, the second asset location score using the second asset score weighting factor if the at least one data point does not satisfy the third proximity threshold.

5. The system of claim 4, wherein the second asset score weighting factor varies with the second asset type.

6. The system of claim 4, wherein the program steps further include:
   if relieving work is performed at a location satisfying the third proximity threshold, reducing the second asset location score.

7. The system of claim 1, wherein the program steps further include:
   reducing the first asset location score if relieving work is performed at a location satisfying the first proximity threshold.

8. The system of claim 1, wherein the program steps further include prioritizing the scored area relative to at least one other scored area.

9. The system of claim 1, wherein the program steps further include rendering into an interactive track chart.

10. The system of claim 1, wherein the at least one data point can comprise at least one of rail tie data, asset data, anchor data, fastener data, track grade data, ballast fouling index data, joint data, rail equipment incident data, rail defect data, velocity data, maintenance data, rail removal data, curve data, or destressing work data.

11. A method of modeling risk of rail buckling in continuous welded rail, the method comprising the steps of:
   collecting at least a portion of a plurality of data points related to a section of a railroad track, the plurality of data points being relevant to a risk of rail buckling on the section of the railroad track;

receiving the plurality of data points related to the section of the railroad track, displaying at least one of the plurality of data points on a track map, each displayed data point having a different identifier;

receiving a plurality of data score weighting factors;

receiving a plurality of asset locations;

receiving a plurality of asset score weighting factors;

determining a first proximity threshold relative to at least one of the plurality of asset locations;

generating, via a processor, a plurality of asset location scores using at least one of the plurality of asset score weighting factors;

determining, via a processor, a distance between at least two of the plurality of asset locations, each having an asset location score; and if a second proximity threshold between the at least two of the plurality of asset locations is satisfied:
generating a consolidated scored area with the at least two of the plurality of asset locations;
generating a consolidated location score including the asset location scores of the at least two of the plurality of asset locations; and
assigning the consolidated location score to the consolidated scored area.

12. The method of claim 11, wherein the plurality of asset locations includes fixed asset locations, anchor locations, and tie cluster locations.

13. The method of claim 11, wherein the plurality of asset score weighting factors includes at least one fixed asset score weighting factor, at least one anchor score weighting factor, and at least one tie score weighting factor.

14. The method of claim 11, wherein the plurality of asset location scores includes at least one fixed asset location score, at least one anchor location score, and at least one tie cluster location score.

15. The method of claim 11, wherein if at least one of the plurality of data points satisfies the first proximity threshold, at least one of the plurality of asset location scores is generated using the at least one of the plurality of data points satisfying the first proximity threshold, at least one of the plurality of data score weighting factors, and at least one of the plurality of asset score weighting factors.

16. A method of assessing risk in a railroad track of continuous welded rail, the method comprising the steps of:
collecting at least a portion of a plurality of data points associated with a railroad track location, the plurality of data points being relevant to a risk of rail buckling on the railroad track;
receiving the plurality of data points, each of the plurality of data points associated with the railroad track location;
displaying at least one of the plurality of data points on a track map, each displayed data point having a different identifier;
receiving a plurality of data score weighting factors;
receiving at least one fixed asset location, at least one tie cluster location, and at least one anchor location;
receiving at least one fixed asset score weighting factor, at least one tie score weighting factor, and at least one anchor score weighting factor;
determining, via a processor, at least one first fixed asset geofence around the at least one fixed asset location, at least one first tie cluster geofence around the at least one tie cluster location, and at least one first anchor geofence around the at least one anchor location;
generating at least one fixed asset location score using the at least one fixed asset score weighting factor and the at least one first fixed asset geofence;
generating at least one tie cluster location score using the at least one tie score weighting factor and the at least one first tie cluster geofence; and
generating at least one anchor location score using the at least one anchor score weighting factor and the at least one first anchor geofence.

17. The method of claim 16, wherein if at least one of the plurality of data points intersects the at least one first fixed asset geofence, the at least one fixed asset location score is generated using the at least one data point intersecting the at least one fixed asset geofence, at least one of the plurality of data score weighting factors, and the at least one fixed asset score weighting factor.

18. The method of claim 16, wherein if at least one of the plurality of data points intersects the at least one first tie cluster geofence, the tie cluster location score is generated using the at least one data point intersecting the at least one tie cluster geofence, at least one of the plurality of data score weighting factors, and the at least one tie score weighting factor.

19. The method of claim 16, wherein if at least one of the plurality of data points intersects the at least one first anchor geofence, the anchor location score is generated using the at least one data point intersecting the at least one anchor geofence, at least one of the plurality of data score weighting factors, and the at least one anchor score weighting factor.

20. The method of claim 16, further comprising the step of determining a plurality of second geofences, including at least one second fixed asset geofence around the at least one fixed asset location, at least one second tie cluster geofence around the at least one tie cluster location, and at least one second anchor geofence around the at least one anchor location.

21. The method of claim 20, further comprising the step of consolidating the at least one fixed asset location, at least one tie cluster location, or at least one anchor location with the other at least one fixed asset location, at least one tie cluster location, or at least one anchor location based on intersections of the second geofences.

22. A continuous welded rail risk modeling system, comprising:
one or more processors operably coupled to a memory and capable of executing machine-readable instructions;
a data foundation system, comprising:
one or more sensors configured to collect at least a portion of a plurality of data points related to a section of a railroad track, the plurality of data points being relevant to a risk of rail buckling on the section of the railroad track;
a data collection module configured to receive, via the one or more processors, at least one data point of the plurality of data points related to the section of the railroad track and display the at least one data point on a track map, each displayed data point having a different identifier, and
a weighting module configured to receive, via the computer processor, at least one data score weighting factor, wherein the at least one data score weighting factor is associated with a type of the at least one data point to determine a statistical weight of the at least one data point, such that a first data score weighting factor of the at least one data score weighting factor associated with a first type of data of a first data point of the at least one data point is different than a second data score weighting factor of the at least one data score weighting factor associated with a second type of data of a second data point of the at least one data point, the first type of data and the second type of data being different; and an asset association and modeling system, comprising:
- a fixed asset relation and scoring module configured to generate, via the one or more processors, fixed asset location scores;
- a tie cluster relation and scoring module configured to generate, via the one or more processors, tie location scores, and
- an anchor layer relation and scoring module configured to generate, via the one or more processors, anchor location scores.

23. The system of claim 22, wherein the asset association and modeling system generates the fixed asset location score using a fixed asset score weighting factor, the received data points satisfying a fixed asset proximity threshold, and data score weighting factors.

24. The system of claim 22, wherein the asset association and modeling system generates the tie cluster location score using a tie cluster score weighting factor, the received data points satisfying a tie cluster proximity threshold, and data score weighting factors.

25. The system of claim 22, wherein the asset association and modeling system generates the anchor location score using an anchor score weighting factor, the received data points satisfying an anchor proximity threshold, and data score weighting factors.

* * * * *